United States Patent
Wu et al.

(10) Patent No.: US 11,624,936 B2
(45) Date of Patent: Apr. 11, 2023

(54) OPTICAL ELEMENT DRIVING MECHANISM

(71) Applicant: TDK TAIWAN CORP., Taoyuan (TW)

(72) Inventors: Fu-Yuan Wu, Taoyuan (TW); Yi-Chieh Lin, Taoyuan (TW); Guan-Bo Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 340 days.

(21) Appl. No.: 16/896,576

(22) Filed: Jun. 9, 2020

(65) Prior Publication Data

US 2021/0080683 A1 Mar. 18, 2021

Related U.S. Application Data

(60) Provisional application No. 62/925,958, filed on Oct. 25, 2019, provisional application No. 62/899,423, filed on Sep. 12, 2019.

(30) Foreign Application Priority Data

Feb. 3, 2020 (CN) .......................... 202020150607.9

(51) Int. Cl.
| | |
|---|---|
| *G02B 27/64* | (2006.01) |
| *G02B 7/09* | (2021.01) |
| *G03B 30/00* | (2021.01) |
| *G02B 7/08* | (2021.01) |
| *H02K 11/21* | (2016.01) |
| *H04N 5/225* | (2006.01) |

(52) U.S. Cl.
CPC ............. *G02B 27/646* (2013.01); *G02B 7/08* (2013.01); *G02B 7/09* (2013.01); *G03B 30/00* (2021.01); *H02K 11/21* (2016.01); *G03B 2205/0053* (2013.01); *H04N 5/2254* (2013.01)

(58) Field of Classification Search
CPC .................................................. G02B 27/646
See application file for complete search history.

(56) References Cited

U.S. PATENT DOCUMENTS

| 7,519,282 B2 * | 4/2009 | Shin ...................... H04N 5/2253 348/208.4 |
|---|---|---|
| 9,438,801 B2 * | 9/2016 | Hwang .................... G02B 7/08 |
| 9,933,629 B2 * | 4/2018 | Minamisawa ........ H04N 5/2254 |
| 9,939,654 B2 * | 4/2018 | Nomura ............... G02B 27/646 |
| 10,110,818 B2 * | 10/2018 | Chung ................. H04N 5/2253 |
| 2016/0025951 A1 * | 1/2016 | Park ...................... G02B 27/646 359/824 |
| 2018/0348538 A1 * | 12/2018 | Sugawara .............. G03B 13/36 |
| 2020/0363608 A1 * | 11/2020 | Lin .......................... G02B 7/08 |

* cited by examiner

*Primary Examiner* — Leon W Rhodes, Jr.
(74) *Attorney, Agent, or Firm* — Muncy, Geissler, Olds & Lowe, P.C.

(57) ABSTRACT

An optical element driving mechanism is provided. The optical element driving mechanism includes a fixed portion, a movable portion, and a driving assembly. The movable portion is movably connected to fixed portion, wherein the movable portion is used for connecting to an optical element having a main axis. The driving assembly is disposed on the fixed portion or the movable portion to move the movable portion relative to the fixed portion.

19 Claims, 26 Drawing Sheets

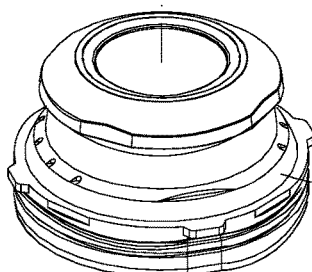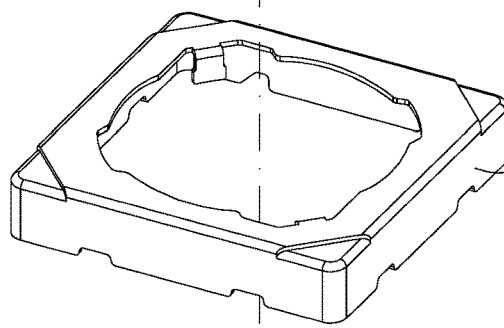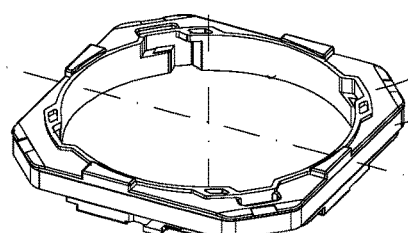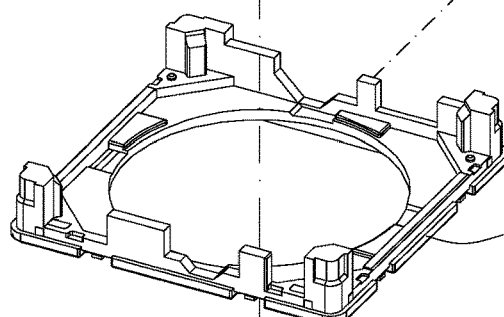
FIG. 5

OPTICAL ELEMENT DRIVING MECHANISM

CROSS REFERENCE TO RELATED APPLICATIONS

This application claims the benefit of U.S. Provisional Application No. 62/899,423, filed on Sep. 12, 2019, No. 62/925,958, filed on Oct. 25, 2019 and China Patent Application No. 202020150607.9, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and a higher durability. As a result, how to effectively reduce the size of the driving mechanism and how to increase its durability has become an important issue.

BRIEF SUMMARY OF DISCLOSURE

An optical element driving mechanism is provided, including a fixed portion, a movable portion, and a driving assembly. The movable portion is movably connected to fixed portion, wherein the movable portion is used for connecting to an optical element having a main axis. The driving assembly is disposed on the fixed portion or the movable portion to move the movable portion relative to the fixed portion.

In some embodiments, the optical element driving mechanism further includes a resilient element, the fixed portion includes a base, wherein the movable portion further includes a first movable portion and a second movable portion, the second movable portion is movably connected to the fixed portion, and the first movable portion and the fixed portion are connected by the resilient element. In some embodiments, the driving assembly includes two first magnetic elements respectively disposed on the first movable portion and the second movable portion. In some embodiments, the fixed portion includes a case, and the case and the first movable portion do not overlap each other when viewed along the main axis. In some embodiments, the driving assembly includes a first magnetic element and a second magnetic element respectively disposed on the movable portion and the fixed portion.

In some embodiments, the first movable portion includes a contact portion in direct contact with the fixed portion. In some embodiments, the fixed portion includes a base having a rectangular shape, the base includes an extending portion at a corner of the base, and the contact portion is in direct contact with the extending portion of the base. In some embodiments, the fixed portion includes a base having a rectangular shape, the base includes an extending portion at a side of the base, and the contact portion is in direct contact with the extending portion of the base. In some embodiments, the contact portion and the fixed portion are made of identical materials. In some embodiments, the material includes metal.

In some embodiments, the fixed portion has a recess, and the portion of the contact portion that contacts the recess is in the shape of a round angle. In some embodiments, the recess has a flat surface in direct contact with the contact portion. In some embodiments, a distance greater than zero is formed between the contact portion and the sidewall of the recess.

In some embodiments, the movable portion includes a first movable portion and a second movable portion, the fixed portion includes a base, the base has a bottom surface facing away from the movable portion, and the minimum distance between the first movable portion and the bottom surface of the base is different than the minimum distance between the second movable portion and the bottom surface of the base. In some embodiments, the fixed portion includes a case, the case has a case opening and a stopping portion surrounding the case opening, and the main axis passes through the case opening. In some embodiments, the fixed portion includes a case having a rectangular shape, and an opening is formed at a corner of the case.

In some embodiments, the fixed portion includes a case and a base, and a recess is formed between the case and the base when viewed in a direction that is perpendicular to the main axis. In some embodiments, the optical element driving mechanism further includes a circuit board and at least three position sensors disposed on the circuit board. In some embodiments, the material of the fixed portion and the movable portion includes non-magnetic permeable material. In some embodiments, the optical element driving mechanism further includes a case movably connected to the movable portion and the fixed portion, and the movable portion includes two contact portions respectively connected to the case and the fixed portion.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 5 is an exploded view of an optical module.

DETAILED DESCRIPTION OF DISCLOSURE

Figure 1:
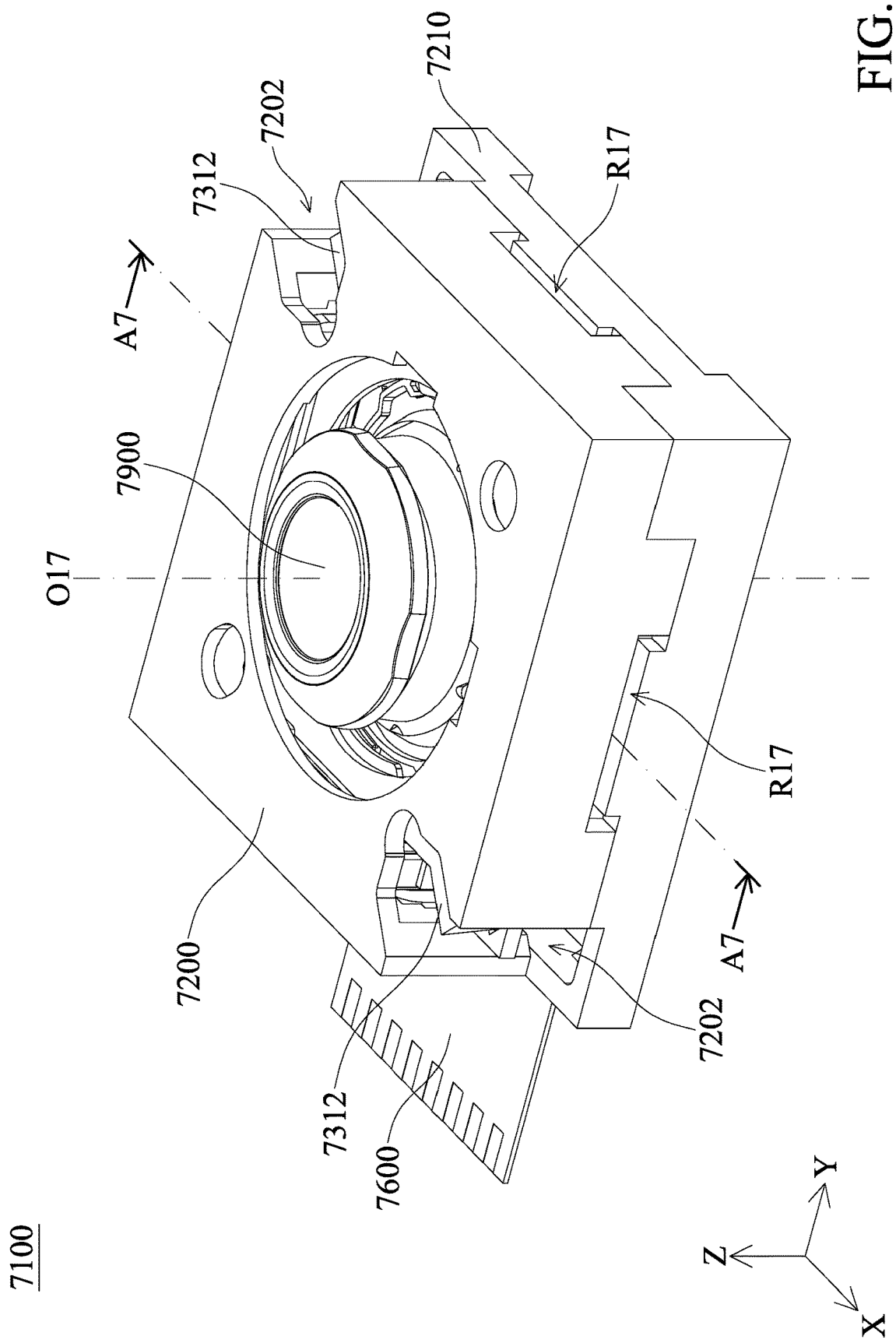
FIG. 1 is a perspective view of an optical element driving mechanism according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

In some embodiments of the present disclosure, FIG. 1 to FIG. 4 are a perspective view and an exploded view of an optical element driving mechanism 7100, a schematic of some elements of the optical element driving mechanism 7100, and a cross-sectional view illustrated along a line A7-A7 in FIG. 1, respectively. The optical element driving mechanism 7100 mainly includes a case 7200, a base 7210, a first movable portion 7310, a second movable portion 7320, a first magnetic assembly 7410 (includes first magnetic elements 7410A and 7410B), a second magnetic assembly 7420 (includes second magnetic elements 7420A and 7420B), a position sensor assembly 7430 (includes position sensors 7430A and 7430B), a circuit board 7600, and a resilient element 7810. In some embodiments, the first movable portion 7310 and the second movable portion 7320 may be called a movable portion M17.

The optical element driving mechanism 7100 may be used for driving an optical module 7900, or it may be used for driving various optical elements, such as a lens, a mirror, a prism, a beam splitter, or an aperture. For example, the optical module 7900 may be attached to the movable portion M17 with glue.

In some embodiments, the case 7200 and the base 7210 may be combined to form the outer case of the optical element driving mechanism 7100. Furthermore, the case 7200 and the base 7210 may be called a fixed portion F17. In some embodiments, the material of the case 7200 and the base 7210 may include metal, such as iron. In some embodiments, the material of the case 7200 and the base 7210 may also include non-magnetic permeable material or weak magnetic permeable material. In some embodiments, the case 7200 may include a case opening 7201 and a stopping portion (not shown) surrounding the case opening 7201 and extending to the movable portion M17 for limiting the movable range of the first movable portion 7310, and the main axis O17 passes through the case opening 7201. The stopping portion may have a shape that is symmetrical to the main axis O17 to balance the movable range of the first movable portion 7310, such as a circular shape. As shown in FIG. 1, a recess R17 may be formed between the case 7200 and the base 7210 when viewed in a direction that is perpendicular to the main axis O17, the recess R17 may be used for accommodating the adhesive for connecting the case 7200 and the base 7210 from flowing to other elements. Furthermore, the contact area between the case 7200 and the base 7210 may be increased.

In some embodiments, the movable portion M17 (includes the first movable portion 7310 and the second movable portion 7320) may be moved relative to the fixed portion F17 (such as including the case 7200 and the base 7210). In some embodiments, the second movable portion 7320 may be moved relative to the first movable portion 7310, and the moving directions of the first movable portion 7310 and the second movable portion 7320 are different (such as rotatable relative to different axes). As a result, the optical module 7900 may move with the movable portion M17 to achieve auto focus (AF) or optical image stabilization (OIS).

In some embodiments, the first magnetic assembly 7410 and the second magnetic assembly 7420 may be called a driving assembly D17 to drive the movable portion M17 moving relative to the fixed portion F17. For example, the first magnetic assembly 7410 and the second magnetic assembly 7420 may include a combination of a driving coil and a driving magnet. For example, the first magnetic assembly 7410 may be a driving magnet, and the second magnetic assembly 7420 may be a driving coil. In another example, the first magnetic assembly 7410 may be a coil, and the second magnetic assembly 7420 may be a driving magnet, and is not limited thereto. The first magnetic assembly 7410 and the second magnetic assembly 7420 may be positioned on the fixed portion F17 and the movable portion M17, respectively. In some embodiments, the positions of the fixed portion F17 and the movable portion M17) may be interchanged. It should be noted that the interaction between the first magnetic assembly 7410 and the second magnetic assembly 7420 may create a magnetic force to move the optical module 7900 relative to the fixed portion, so auto focus (AF) or optical image stabilization (OIS) may be achieved. In some embodiments, the driving assembly D17 may include other driving elements, such as piezoelectric elements, shape memory alloys, etc.

Furthermore, the circuit board 7600 may be, for example, a flexible printed circuit, which may be affixed on the fixed portion F17 by adhesion. In some embodiments, the circuit board 7600 is electrically connected to other electronic elements disposed inside or outside the optical element driving mechanism 7100. For example, the circuit board 7600 may send electric signals to the driving assembly D17 to control the movement of the movable portion M17.

In some embodiments, the position sensor assembly 7430 may be disposed in the optical element driving mechanism 7100 to detect the position of the movable portion M17 relative to the fixed portion F17. The position sensor assembly 7430 may include a Hall effect sensor, a magnetoresistance effect sensor (MR Sensor), a giant magnetoresistance effect sensor (GMR sensor), a tunneling magnetoresistance effect sensor (TMR sensor), or a fluxgate sensor. In some embodiments, the position sensor assembly 7430 may be affixed on the fixed portion F17 for detecting the position of the movable portion M17 relative to the fixed portion F17. For example, the position sensor assembly 7430 may be disposed on the case 7200 or the base 7210.

Figure 2:
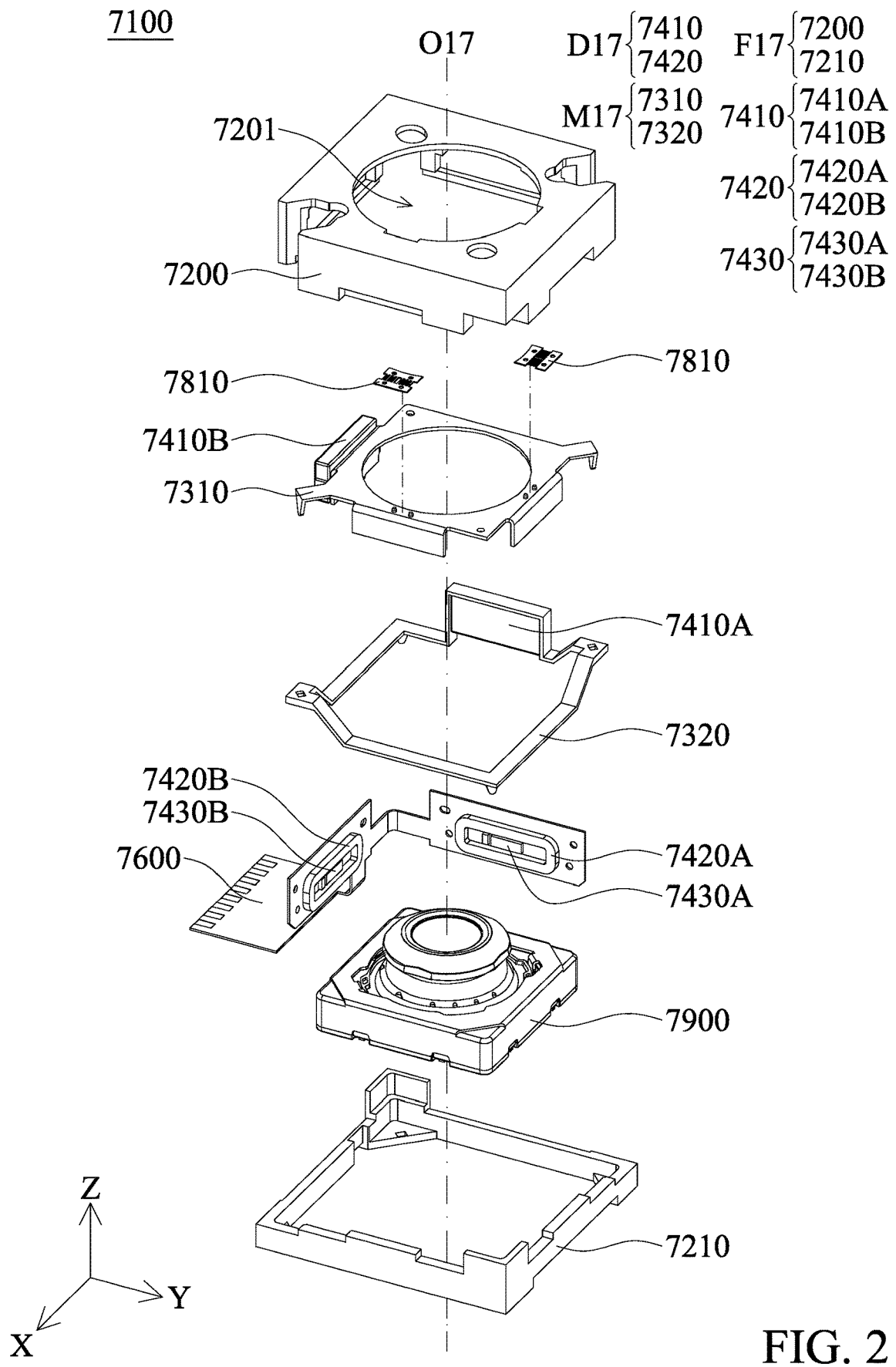
FIG. 2 is an exploded view of the optical element driving mechanism.

Although the main axis O17 in FIG. 2 does not pass through the circuit board 7600, the present disclosure is not limited thereto. For example, in some embodiments, the circuit board 7600 may have a portion (not shown) that extends to the light exit side of the optical module 7900, i.e. it overlaps the optical module 7900 in the Z axis. Furthermore, additional position sensors may be provided on the portion of the circuit board 7600 that extends to the light exit side of the optical module 7900. In other words, the optical element driving mechanism 7100 may include at least three position sensors to improve performance.

FIG. 5 is an exploded view of the optical module 7900. The optical module 7900 may include a frame 7910, a base 7920, and an optical element 7990 disposed between the frame 7910 and the base 7920. It should be noted that a case opening and a bottom opening are formed on the frame 7910 and the base 7920, respectively. The center of the case opening corresponds to the main axis O17 of the optical element 7990, and the base opening corresponds to a photo sensor (not shown). As a result, the optical element 7990 disposed in the optical module 7900 may focus with the photo sensor along the main axis O17 (i.e. the Z direction).

Furthermore, a movable assembly 7930 which is movable relative to the frame 7910 and the base 7920 may be disposed in the optical module 7900, and the optical element 7990 may be fixed on the movable assembly 7930, such as by locking, gluing, or engaging. Furthermore, additional driving component may be provided in the optical module 7900, such as a first driving magnetic element 7940 and a second driving magnetic element 7950, to move the optical element 7990 with the movable assembly 7930 in a direction that is different than the moving direction of the movable portion M17. As a result, the optical element 7990 may be moved in more directions. The first driving magnetic element 7940 and a second driving magnetic element 7950 may include a combination of a magnet and a coil, such as the first driving magnetic element 7940 may be a coil, and the second driving magnetic element 7950 may be a magnet. For example, the optical element 7990 may be moved in the X, Y, or Z direction.

The substrate 7980 may be, for example, a flexible printed circuit board, which may be affixed on the base 7920 by adhesion. In some embodiments, the substrate 7980 is electrically connected to other electronic elements disposed inside or outside the optical module 7900. For example, the substrate 7980 may send electric signals to the driving component to control the movement of the movable assembly in the X, Y or Z direction.

Figure 6:
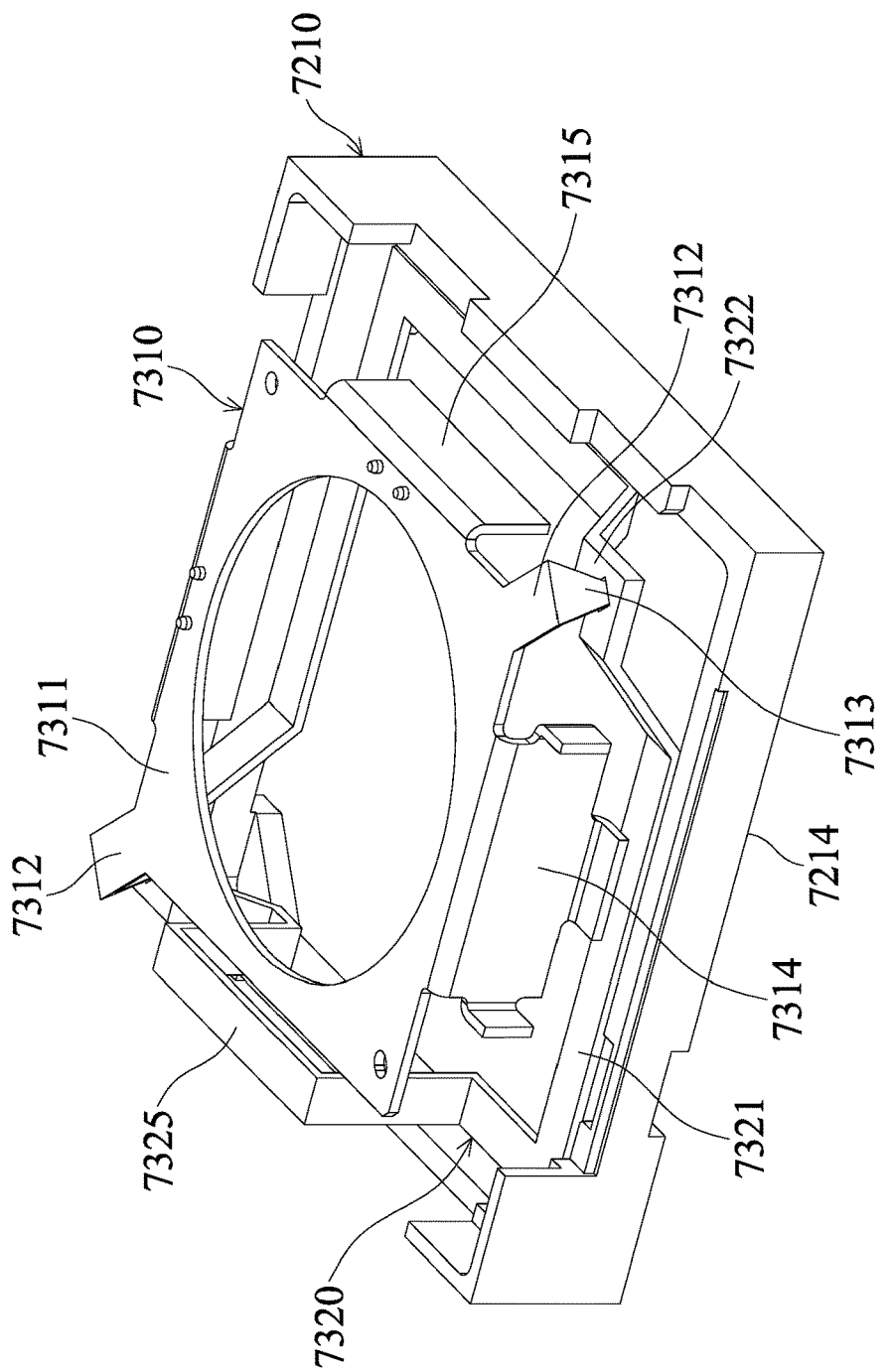
FIG. 6 is a schematic view of some elements of the optical element driving mechanism.
Figure 7:
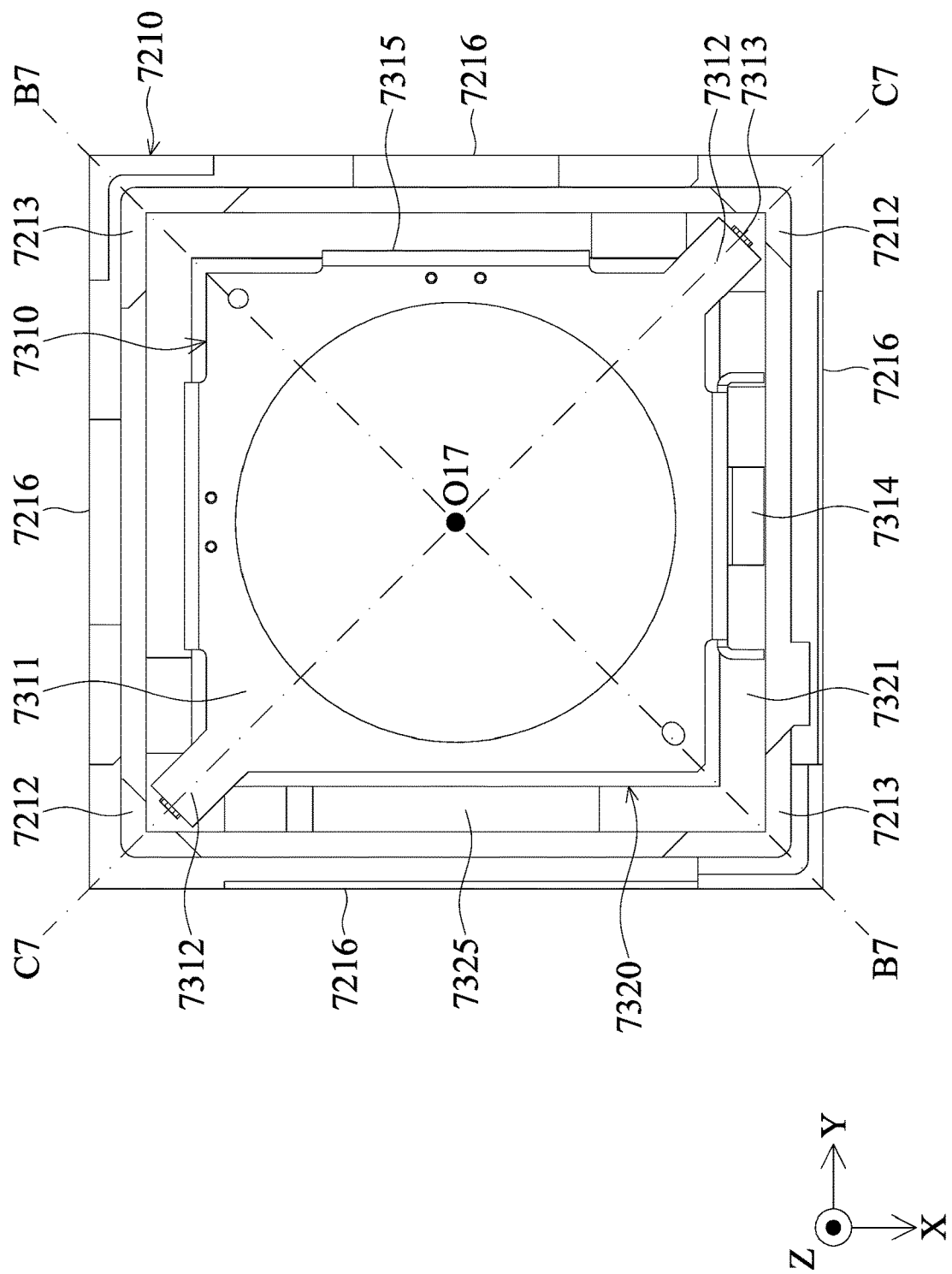
FIG. 7 is a top view of some elements of the optical element driving mechanism.
Figure 8:
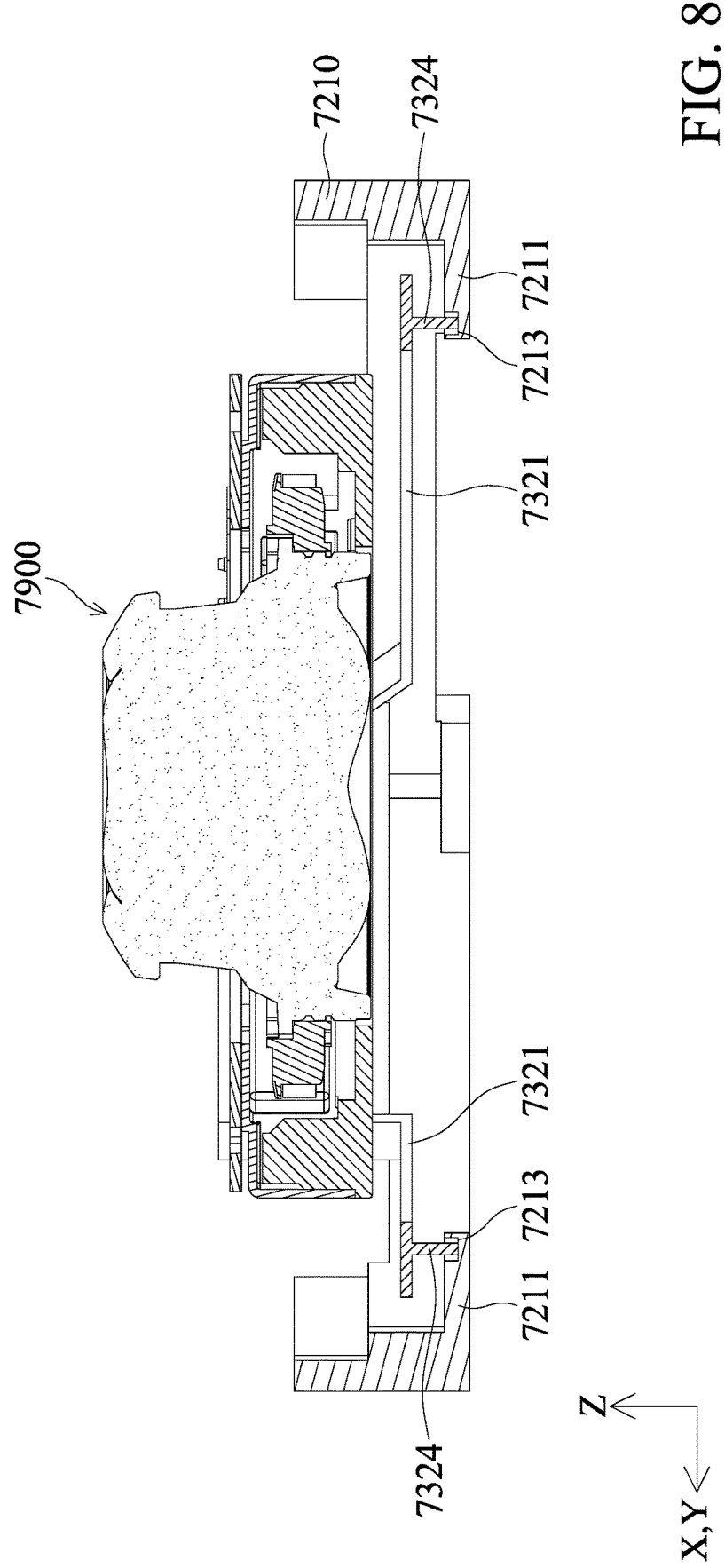
FIG. 8 is a cross-sectional view of some elements of the optical element driving mechanism.
Figure 9:
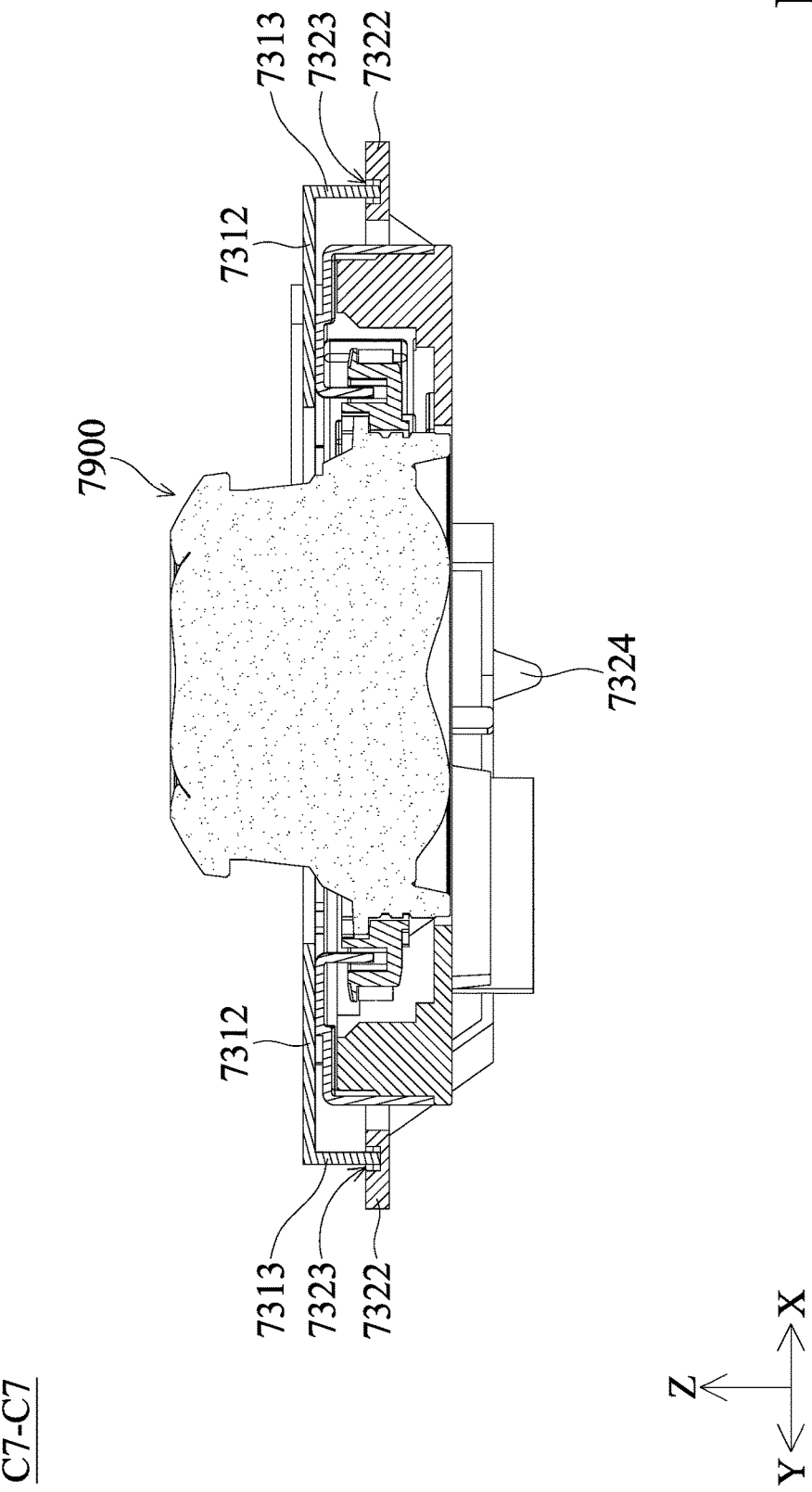
FIG. 9 is a cross-sectional view of some elements of the optical element driving mechanism.
Figure 10:
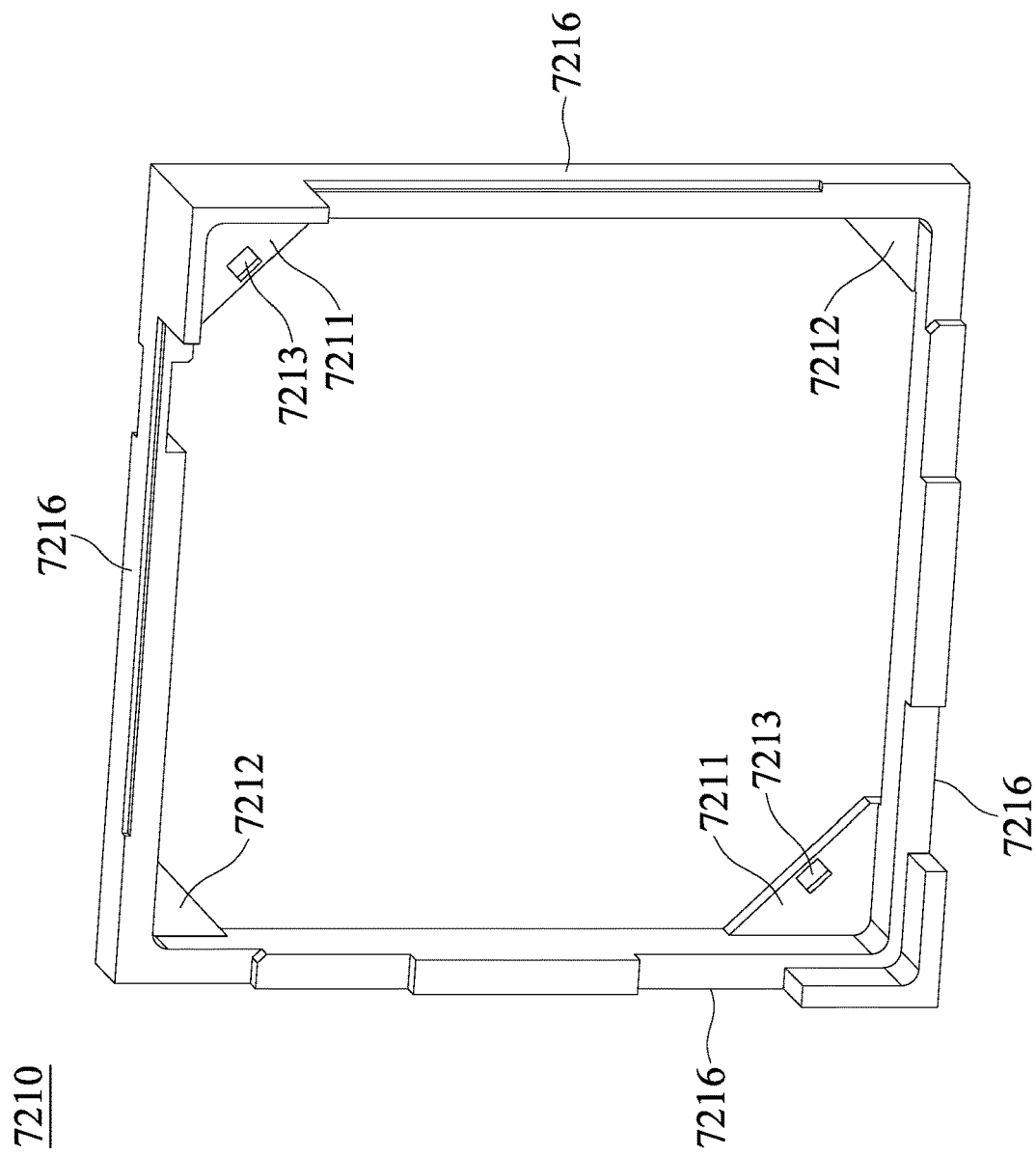
FIG. 10 is a schematic view of the base.
Figure 11:
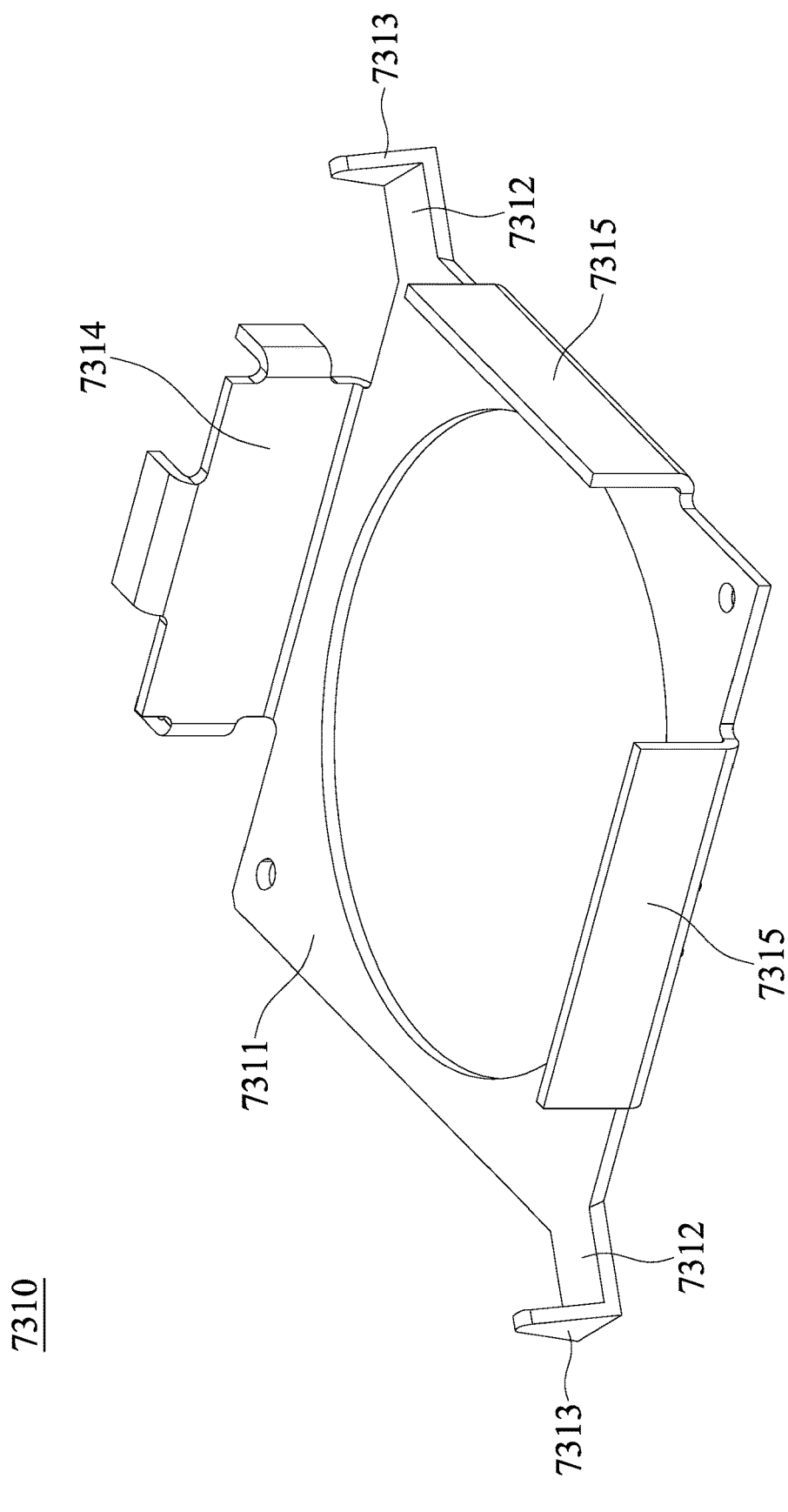
FIG. 11 is a schematic view of the first movable portion.
Figure 12:
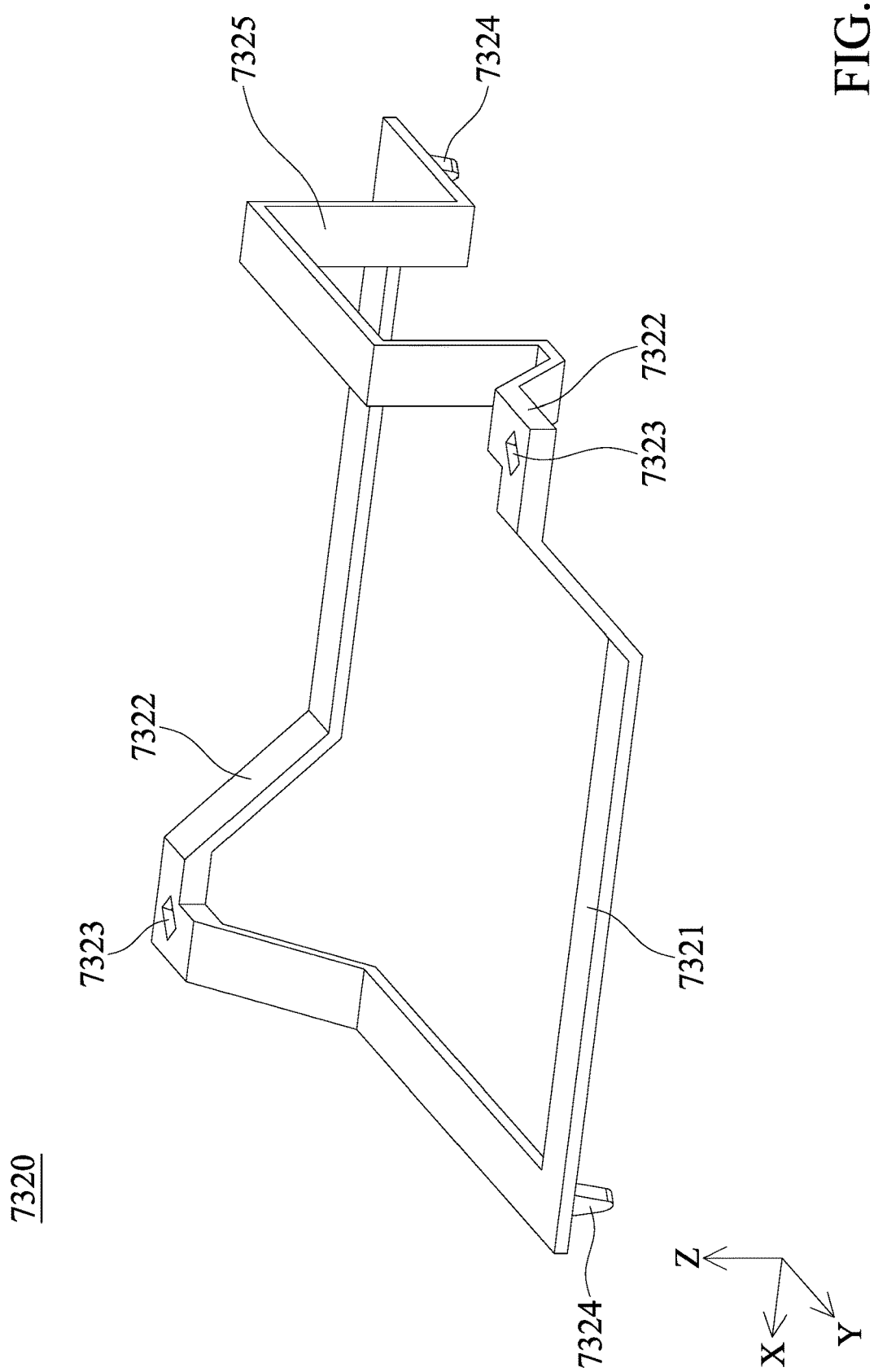
FIG. 12 is a schematic view of the second movable portion.

FIG. 6 and FIG. 7 are a schematic view and a top view of some elements of the optical element driving mechanism 7100, FIG. 8 and FIG. 9 are cross-sectional views of the optical element driving mechanism 7100 illustrated along the line B7-B7 and C7-C7 in FIG. 7, FIG. 10 is a schematic view of the base 7210, FIG. 11 is a schematic view of the first movable portion 7310, and FIG. 12 is a schematic view of the second movable portion 7320.

The base 7210 has a rectangular shape. Extending portions 7211 may be positioned on two of the corners of the base 7210. The strengthening portions 7212 may be positioned on the other two corners. A recess 7213 may be formed in the extending portion 7211.

The first movable portion 7310 includes a main body 7311, two extending portions 7312 extending from the main body 7911 in a direction that is substantially perpendicular to the main axis O17, contact portions 7313 extending from the extending portion 7312, accommodating portions 7314 extending from the main body 7311 in a direction that is substantially parallel to the main axis O17, and blocking walls 7315 extending from the main body 7311 in a direction that is substantially parallel to the main axis O17.

The second movable portion includes a main body 7321, two bending portions 7322 bent from the main body 7321, recesses 7323 formed on the bending portions 7322, contact portions 7324 formed on the main body 7321, and an accommodating portion 7325 bent from the main body 7321.

Figure 13:
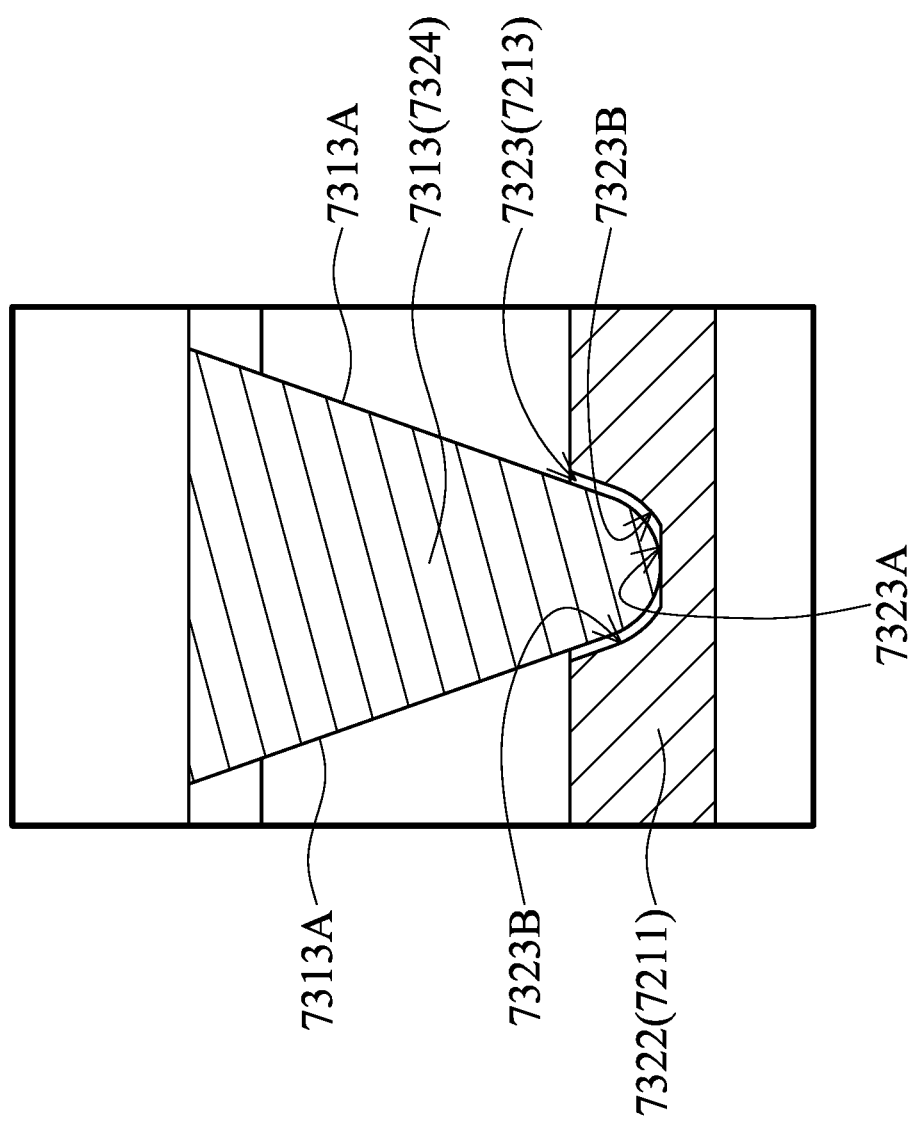
FIG. 13 is a partial cross-sectional view of some elements of the optical element driving mechanism.

As shown in FIG. 6, FIG. 8, and FIG. 9, the contact portion 7313 of the first movable portion 7310 may be disposed in the recess 7323 of the second movable portion 7320, and the contact portion 7324 of the second movable portion 7320 may be disposed in the recess 7213 of the base 7210. FIG. 13 is a partial cross-sectional view of the contact portion 7313 and the recess 7323 (or the contact portion 7324 and the recess 7213). It should be noted that the shape of the portion of the contact portion 7313 that contacts the recess 7323 may be a round angle, and the recess 7323 may have a flat surface 7323A in direct contact with the contact portion 7313. A distance may form between the contact portion 7313 and the sidewall 7323B of the recess 7323, so the contact portion 7313 may move in the recess 7323, and the friction between the contact portion 7313 and the recess 7323 may be reduced. Furthermore, in FIG. 13, an angle between the two sides 7313A of the contact portion 7313 may be less than an angle between the two sidewalls 7323B of the recess 7323, so the first movable portion 7310 and the second movable portion 7320 may be easily assembled with each other.

In some embodiments, the contact portion 7313 and the recess 7323 (or the contact portion 7324 and the recess 7213) may be made of the same material, and therefore have similar hardness, and the durability during operation may be enhanced. For example, the contact portion 7313 and the recess 7323 (or the contact portion 7324 and the recess 7213) may be made of metal, to further enhance their durability.

In some embodiments, as shown in FIG. 6, the second movable portion 7320 has the bending portion 7322 bent to Z direction, and the contact portion 7313 of the first movable portion 7310 contacts the bending portion 7322, so the minimum distance between the first movable portion 7310 and the bottom surface 7214 of the base 7210 may be different than the minimum distance between the second movable portion 7320 and the bottom surface of the base 7210 in Z direction.

It should be noted that as shown in FIG. 7, the strengthening portion 7212 of the base 7210 may act as a stopping portion for stopping the rotational movement of the second movable portion 7320 relative to the line B7-B7 in some embodiments. In particular, as shown in FIG. 7, the strengthening portion 7212 and the second movable portion 7320 at least overlap each other along the main axis O17 (Z axis). As a result, the movable range of the second movable portion 7320 may be restricted to prevent the second movable portion 7320 from being damaged by colliding with other elements. In some embodiments, the strengthening portion 7212 includes metal, so the mechanical strength of the strengthening portion 7212 may be further increased.

As shown in FIG. 7, the line B7-B7 passes through the two contact points between the second portion 7320 and the base 7210, and the line C7-C7 passes through the two contact points between the first movable portion 7310 and the second movable portion 7320, so the first movable portion 7310 and the second movable portion 7320 may rotate relative to the line C7-C7 and the line B7-B7, so movement in different dimensions may be achieved. Although the contact points are substantially positioned at the corners of the optical element driving mechanism 7100, the present disclosure is not limited thereto. For example, the contact points may be positioned at the sides of the optical element driving mechanism 7100. In other words, the connecting of the two contact points may be substantially perpendicular to a side 7216 of the optical element driving mechanism 7100.

Figure 3:
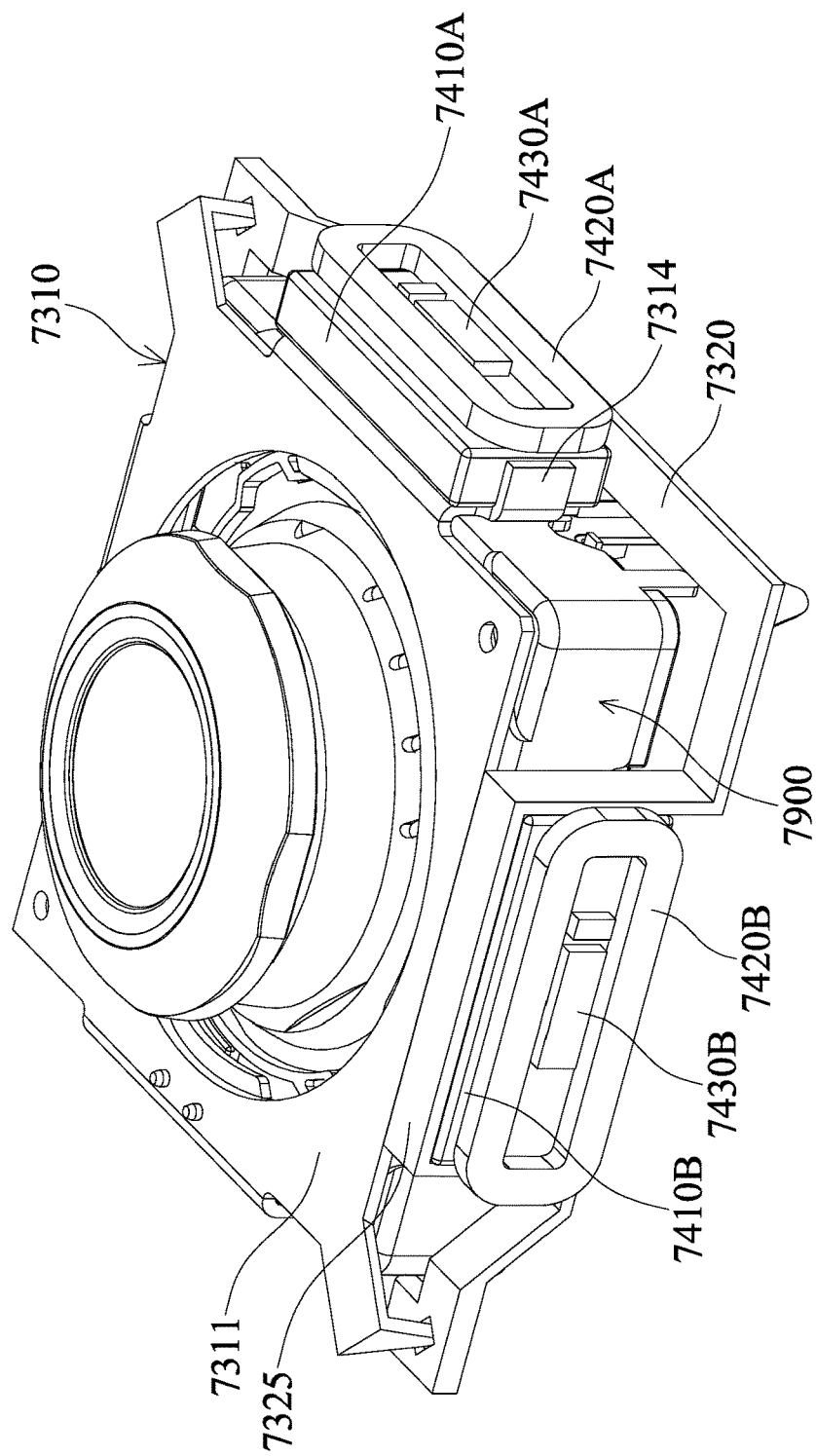
FIG. 3 is a schematic view of some elements of the optical element driving mechanism.
Figure 4:
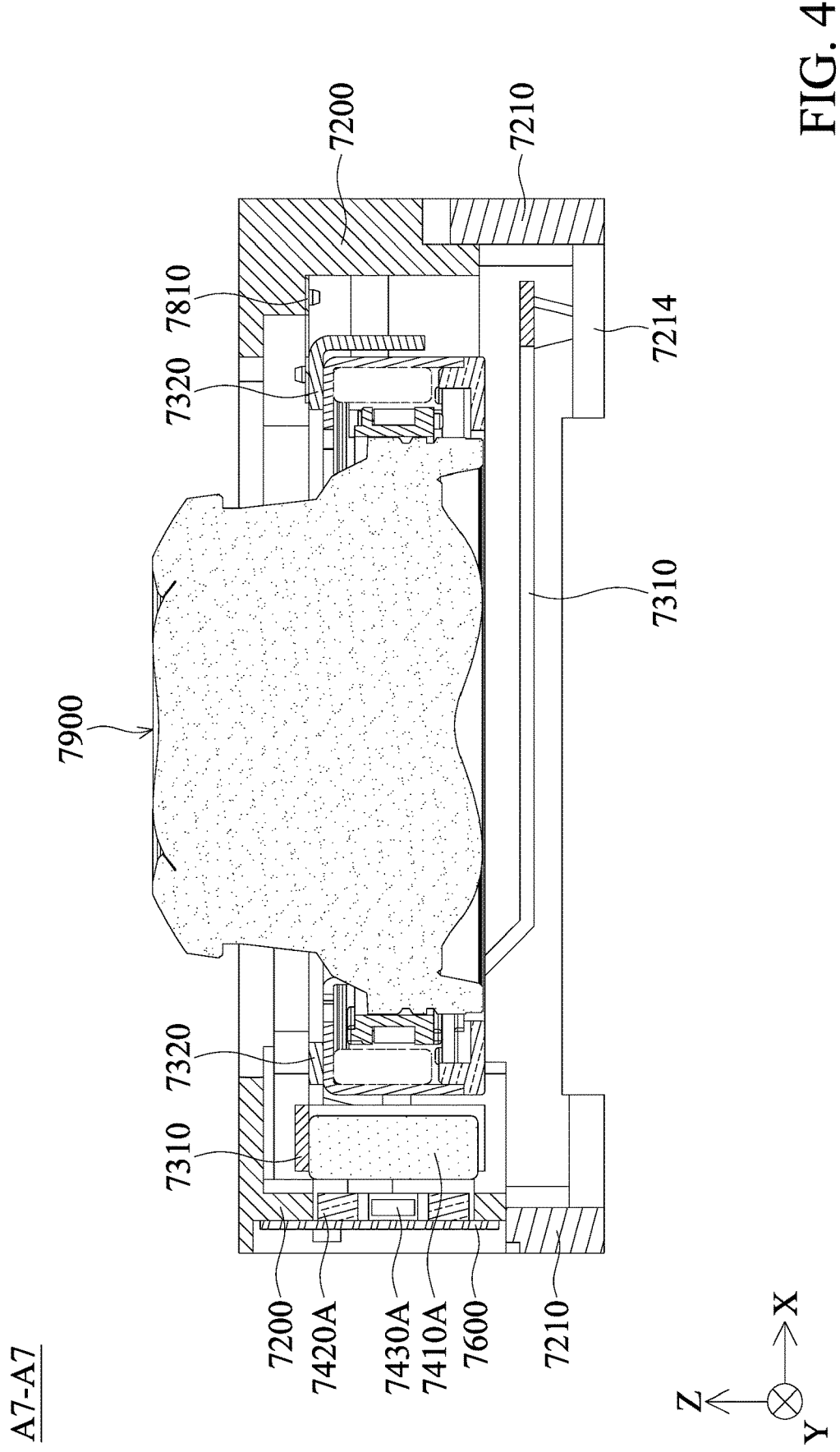
FIG. 4 is a cross-sectional view of the optical element driving mechanism.

Referring to FIG. 3, FIG. 11, and FIG. 12, the first magnetic element 7410A and the first magnetic element 7410B may be disposed on the accommodating portion 7314 of the first movable portion 7310 and the accommodating portion 7325 of the second movable portion 7320, respectively. The second magnetic elements 7420A and 7420B may be disposed on the circuit board 7600, so the first movable portion 7310 and the second movable portion 7320 may be driven by the first magnetic element 7410A and the first magnetic element 7410B to allow the first movable portion 7310 and the second movable portion 7320 to move in different directions.

Although the main body 7311 of the first movable portion 7310 overlaps the optical module 7900 in Z direction, the present disclosure is not limited thereto. For example, in some embodiments, the main body 7311 may surround the sidewall of the optical module 7900 in X or Y direction and may be attached on the optical module 7900, so the height of the optical element driving mechanism 7100 in Z axis may be further reduced.

In some embodiments, as shown in FIG. 1 and FIG. 11, the case 7200 may have openings 7202 at the corners that corresponding to the extending portions 7312 of the first movable portion 7310 to prevent the extending portion 7312 and the case 7200 from colliding with each other, so the durability of the optical element driving mechanism 7100 may be enhanced. For example, the extending portion 7312 is at least partially exposed from the opening 7202 in the main axis O17.

In some embodiments, the elements of the optical element driving mechanism 7100 may be weak magnetic permeable material or non-magnetic permeable material to prevent magnetic interference from occurring when the optical element driving mechanism 7100 or the optical module 7900 is operating.

Figure 14:
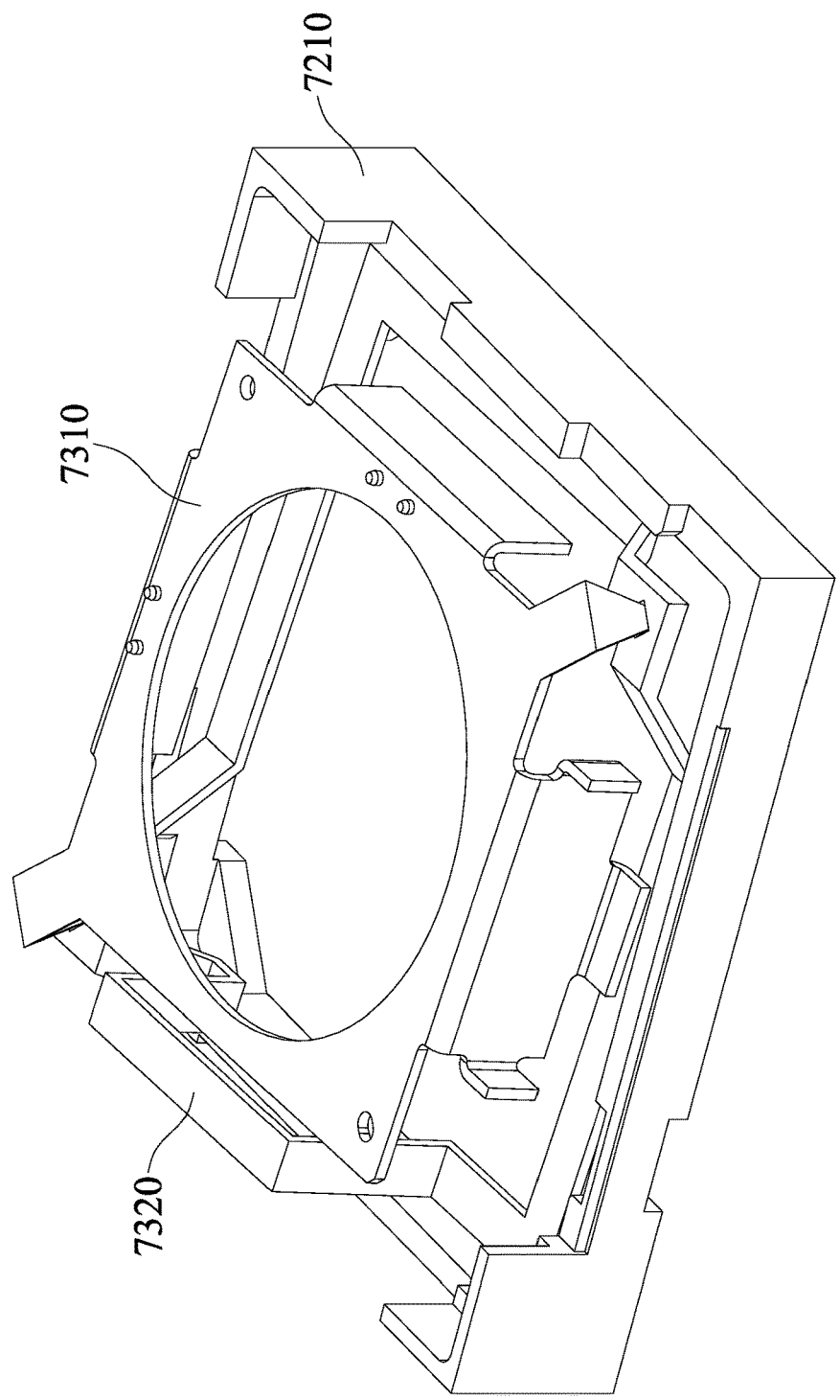
FIG. 14 is a perspective view when the second movable portion rotates relative to the base.
Figure 15:
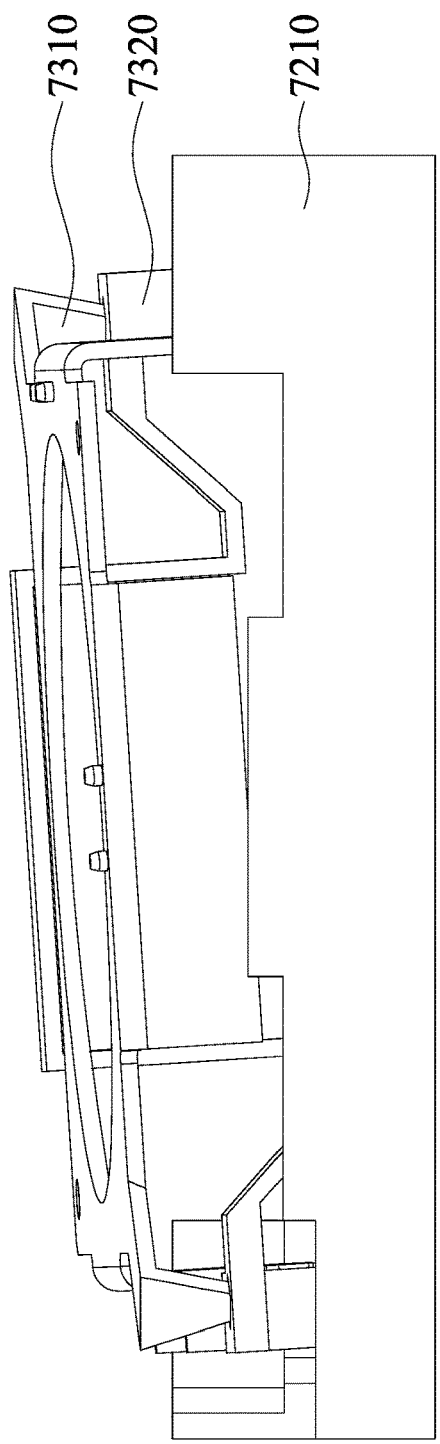
FIG. 15 is a side view when the second movable portion rotates relative to the base.
Figure 16:
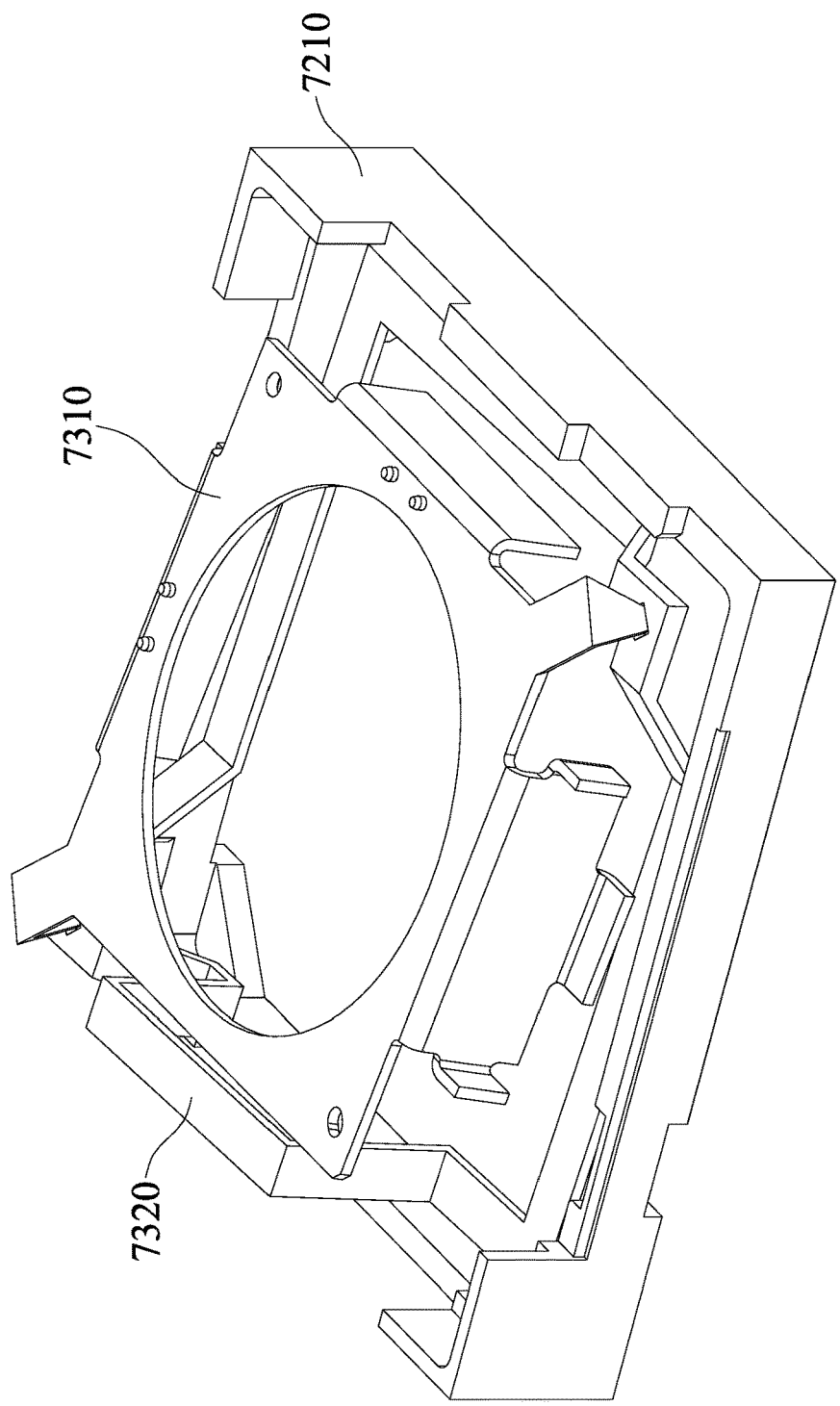
FIG. 16 is a perspective view when the first movable portion further rotates relative to the second movable portion after the condition in FIG. 14.
Figure 17:
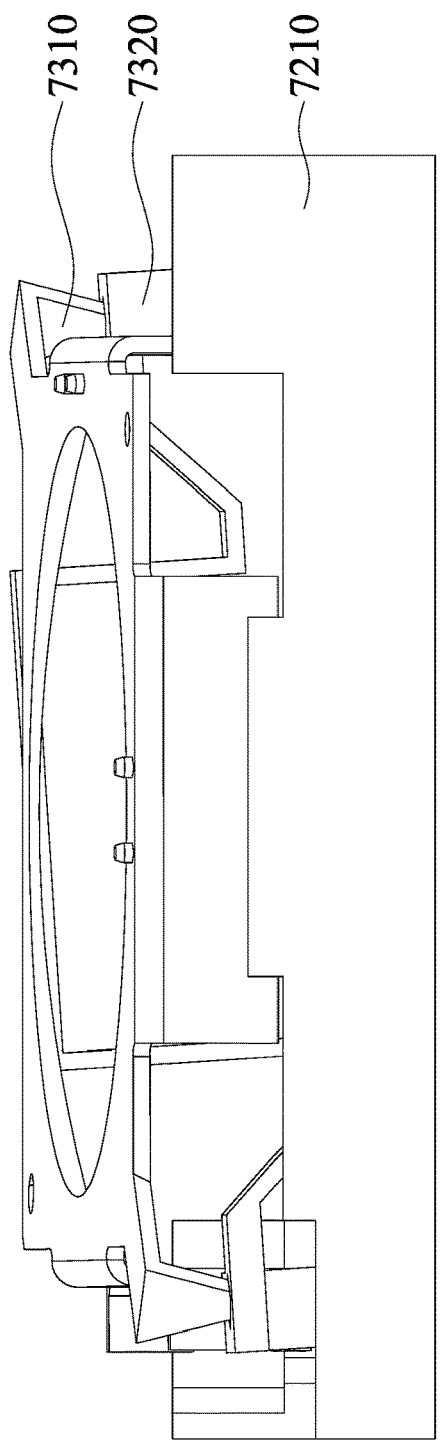
FIG. 17 is a side view when the first movable portion further rotates relative to the second movable portion after the condition in FIG. 14.

FIG. 14 and FIG. 15 are a perspective view and a side view when the second movable portion 7320 rotates relative to the base 7210, wherein the first movable portion 7310 does not move relative to the second movable portion 7320. FIG. 16 and FIG. 17 are a perspective view and a side view when the first movable portion 7310 further rotates relative to the second movable portion 7320 after the condition in FIG. 14. As shown in FIG. 14 to FIG. 17, the movable portion M17 may be rotated in different directions by the driving force generated from the driving assembly D17, so effects such as optical image stabilization (OIS) may be achieved.

Figure 18:
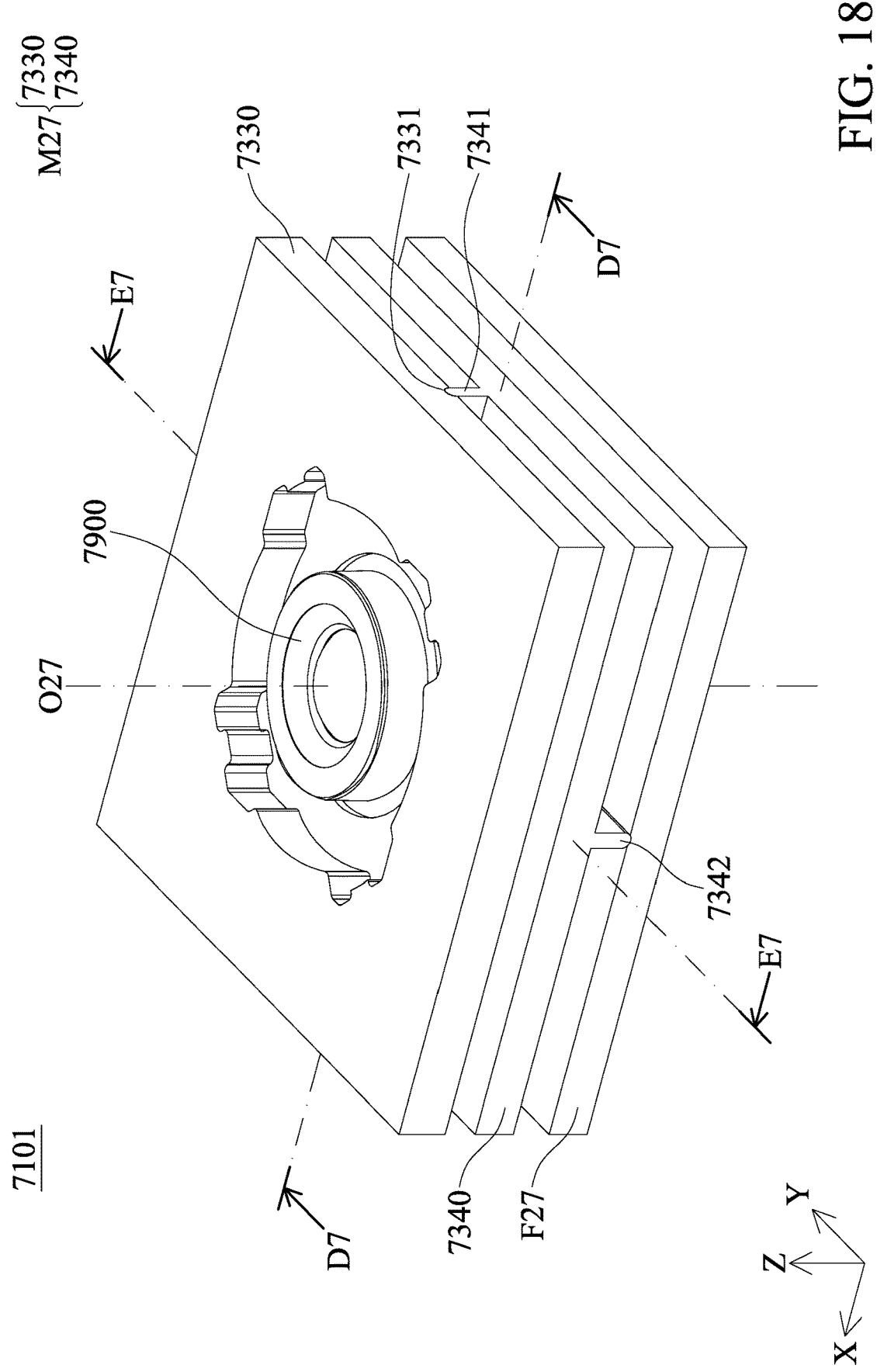
FIG. 18 is a perspective view of an optical element driving mechanism according to some embodiments of the present disclosure.
Figure 19:
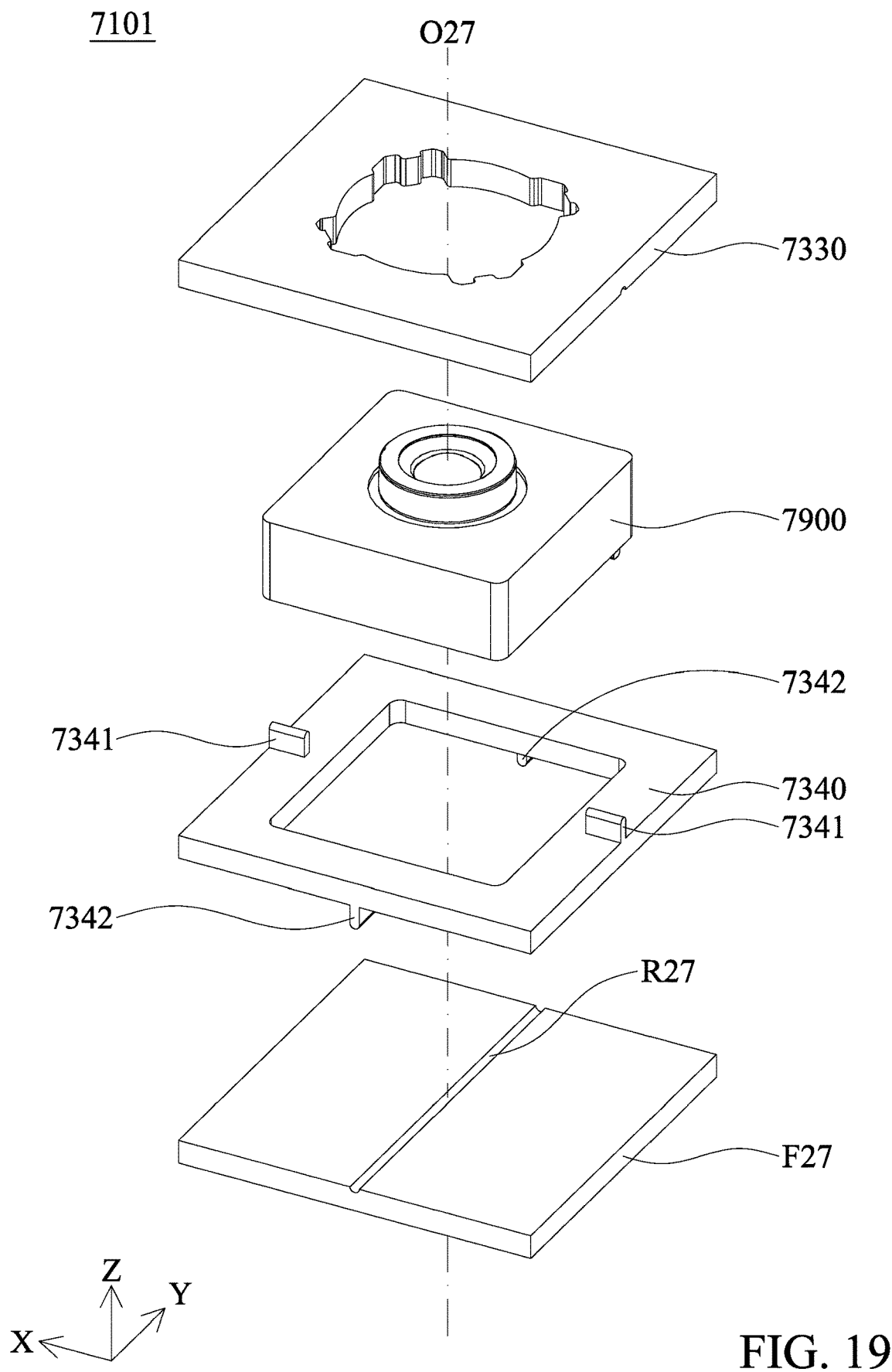
FIG. 19 is an exploded view of an optical element driving mechanism according to some embodiments of the present disclosure.

FIG. 18 and FIG. 19 are a schematic view and an exploded view of an optical element driving mechanism 7101 in other embodiments of the present disclosure. As shown in FIG. 18 and FIG. 19, the optical element driving mechanism 7101 may include a fixed portion F27, a first movable portion 7330, and a second movable portion 7340 disposed between the first movable portion 7330 and the fixed portion F27. The fixed portion F27, the first movable portion 7330, and the second movable portion 7340 are arranged in a main axis O27. The first movable portion 7330 and the second movable portion 7340 may be called a movable portion M27. The optical element driving mechanism 7101 may be used for driving an optical module 7900, or it may be used for driving various optical elements, such as a lens, a mirror, a prism, a beam splitter, or an aperture. For example, the optical module 7900 may be attached to the movable portion M27 with glue so that it moves with the movable portion M27. It should be noted that some of the aforementioned elements, such as the driving assembly, the position sensor assembly, and the circuit board, are omitted for clarity in FIG. 18 and FIG. 19.

The second movable portion 7340 may has two contact portions 7341 extending to the fixed portion F27 and two contact portions 7342 extending to the first movable portion 7330. The contact portions 7341 and the two contact portions 7342 may be disposed in the recess R27 of the fixed portion F27 and the recess 7331 of the first movable portion 7330, respectively. In other words, the contact portions 7341 and the contact portions 7342 have opposite extending directions. In some embodiments, the line D7-D7 of the two contact portions 7341 may be substantially to the line E7-E7 of the two contact portions 7342 to allow the first movable portion 7330 and the second movable portion 7340 to move in different directions.

Figure 20:
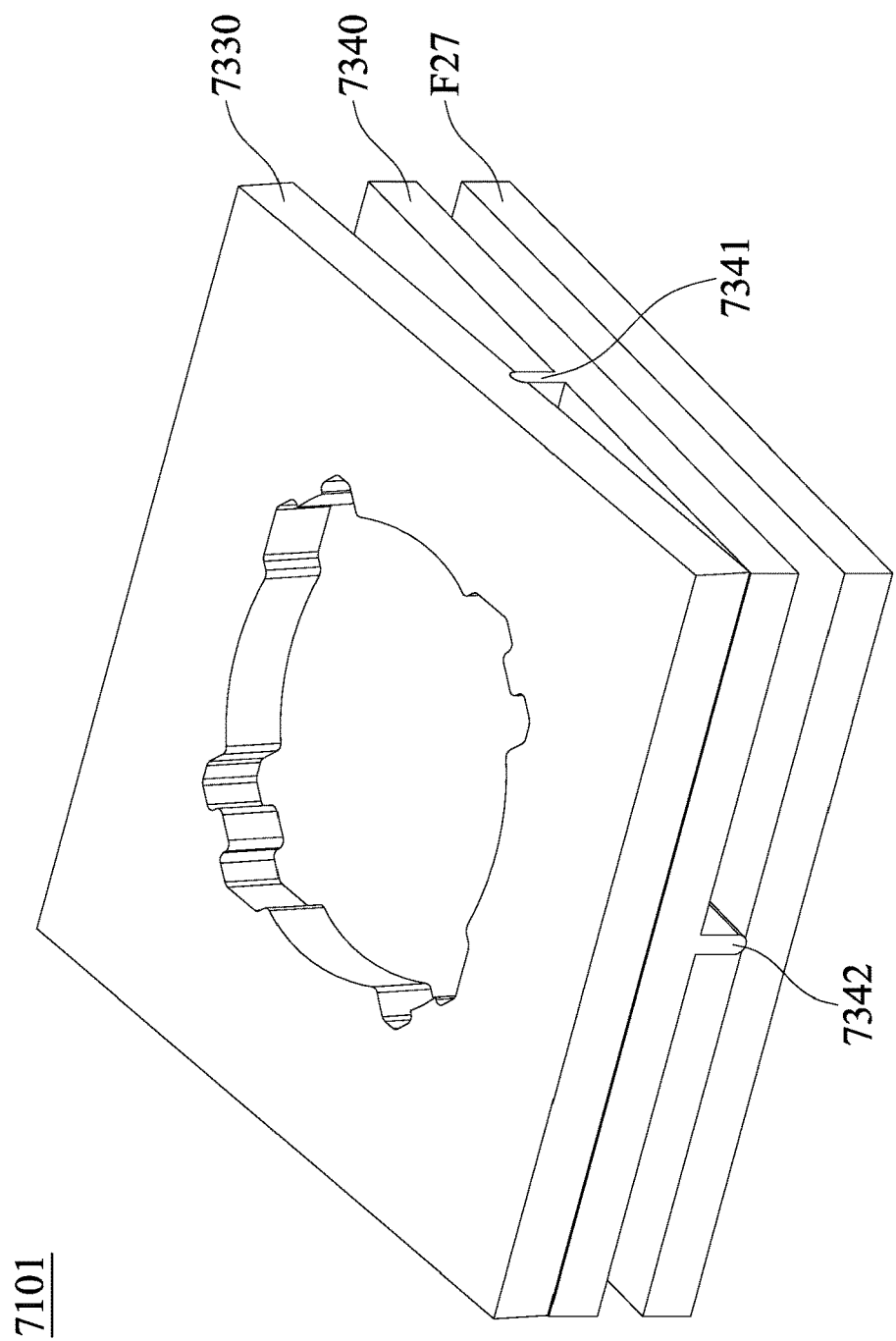
FIG. 20 is a perspective view when the first movable portion rotates relative to the second movable portion.
Figure 21:
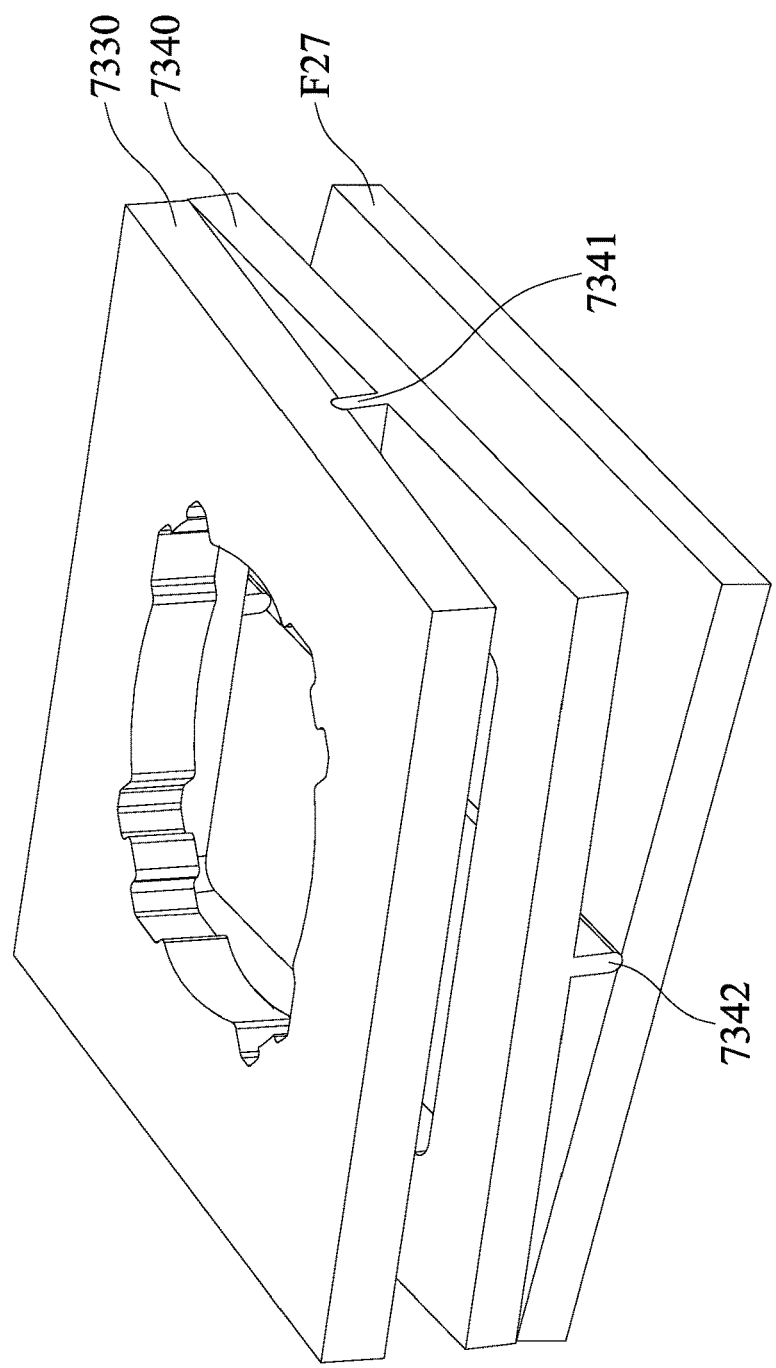
FIG. 21 is a perspective view when the second movable portion further rotates relative to the fixed portion after the condition in FIG. 20.

FIG. 20 is a perspective view when the first movable portion 7330 rotates relative to the second movable portion 7340, wherein the second movable portion 7340 does not move relative to the fixed portion F27. FIG. 21 is a perspective view when the second movable portion 7340 further rotates relative to the fixed portion F27 after the condition in FIG. 20. As shown in FIG. 20 and FIG. 21, the movable portion M27 may rotate in different directions by the driving force generated from the driving assembly to achieve optical image stabilization.

Figure 22:
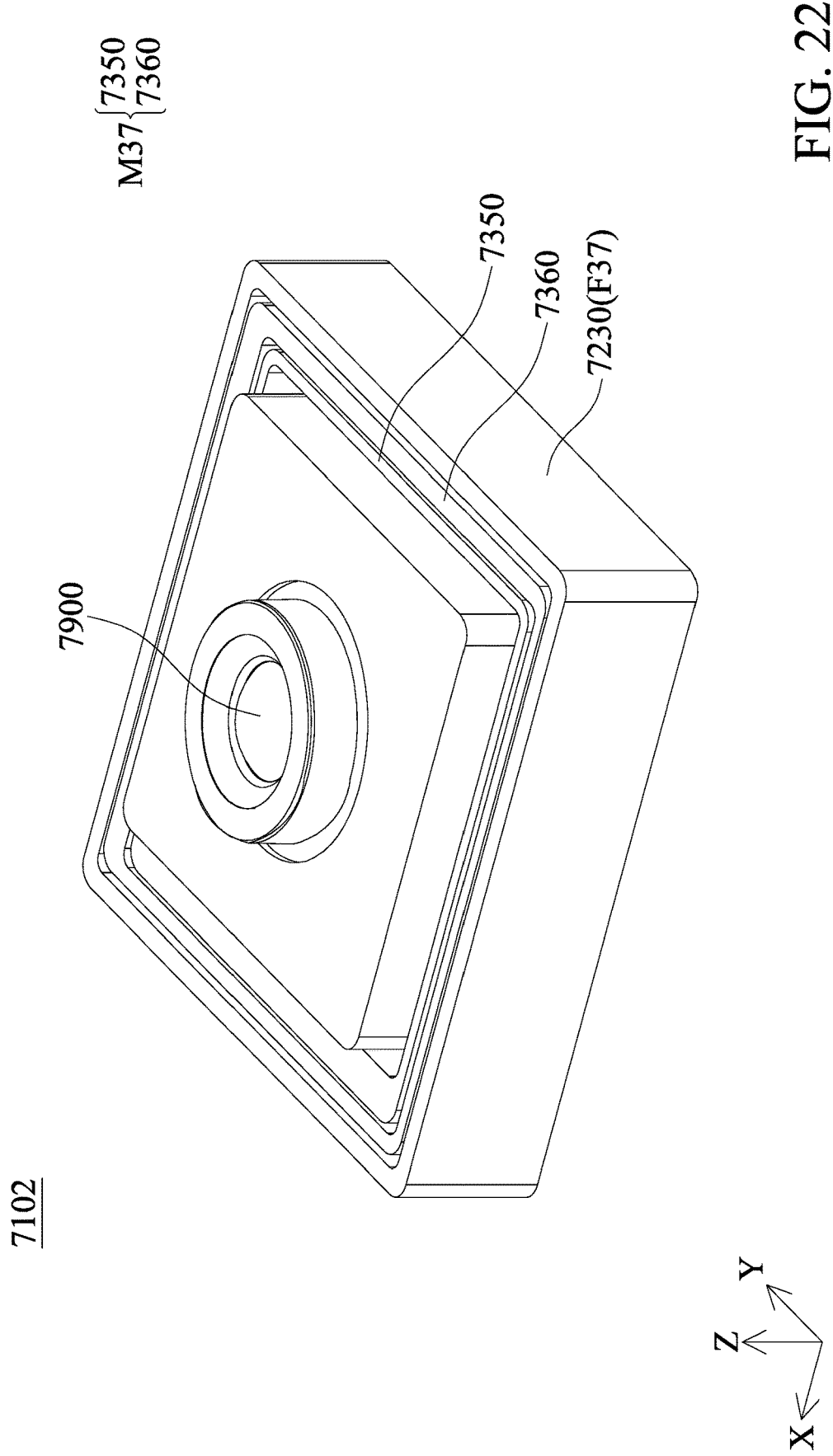
FIG. 22 is a schematic view of an optical element driving mechanism according to some embodiments of the present disclosure.
Figure 23:
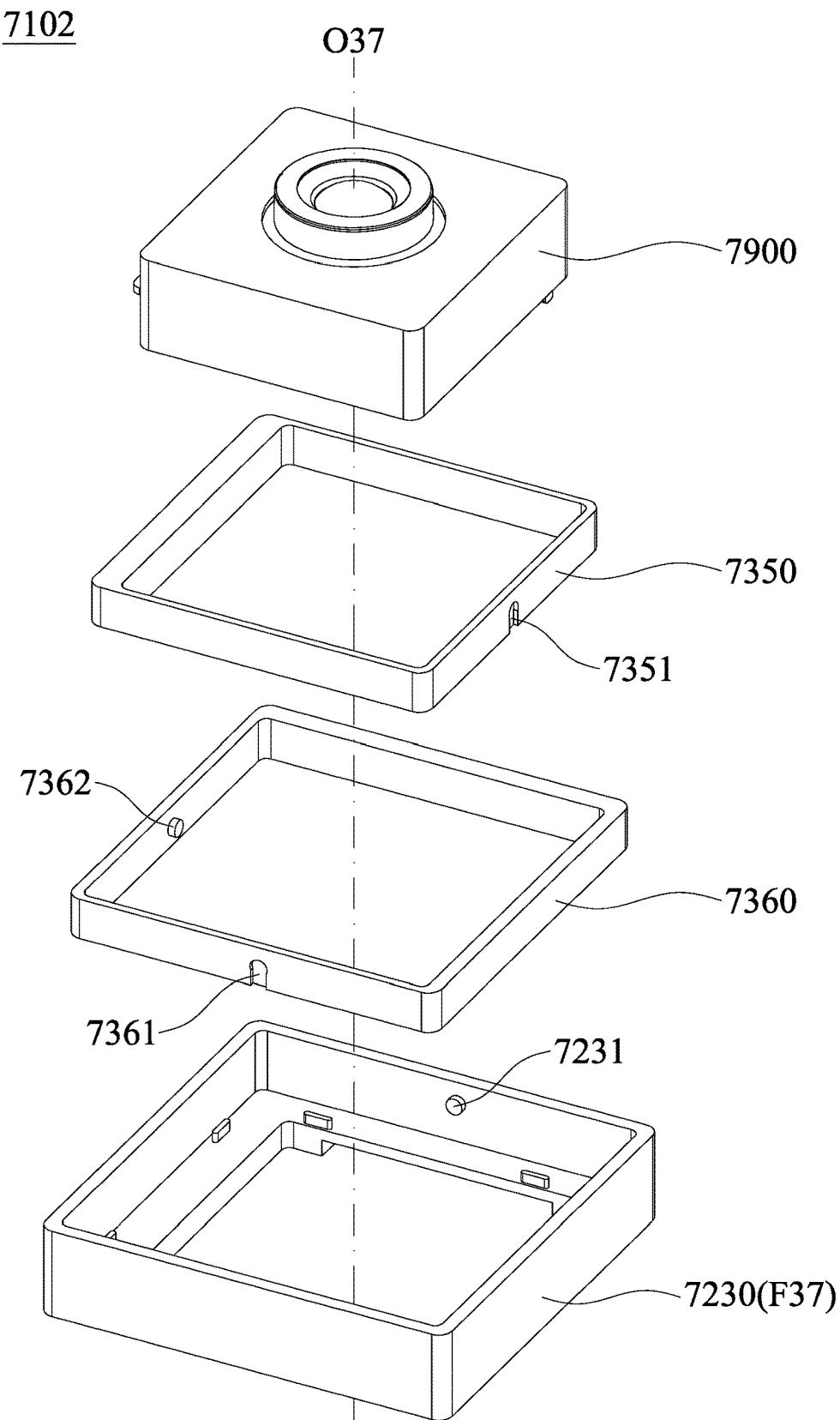
FIG. 23 is an exploded view of an optical element driving mechanism according to some embodiments of the present disclosure.

FIG. 22 and FIG. 23 are a schematic view and an exploded view of an optical element driving mechanism 7102 according to some embodiments of the present disclosure. The optical element driving mechanism 7102 may include a base 7230 (or a fixed portion F37), a first movable portion 7350, and a second movable portion 7360 disposed between the first movable portion 7350 and the fixed portion F37. The fixed portion F37, the first movable portion 7350, and the second movable portion 7360 are arranged in a main axis O37. The first movable portion 7350 and the second movable portion 7360 may be called a movable portion M37. The optical element driving mechanism 7102 may be used for driving an optical module 7900, or it may be used for driving various optical elements, such as a lens, a mirror, a prism, a beam splitter, or an aperture. For example, the optical module 7900 may be attached to the movable portion M37 with glue so that it moves with the movable portion M37. It should be noted that some of the aforementioned elements, such as the driving assembly, the position sensor assembly, and the circuit board, are omitted for clarity in FIG. 20 and FIG. 21.

Figure 24:
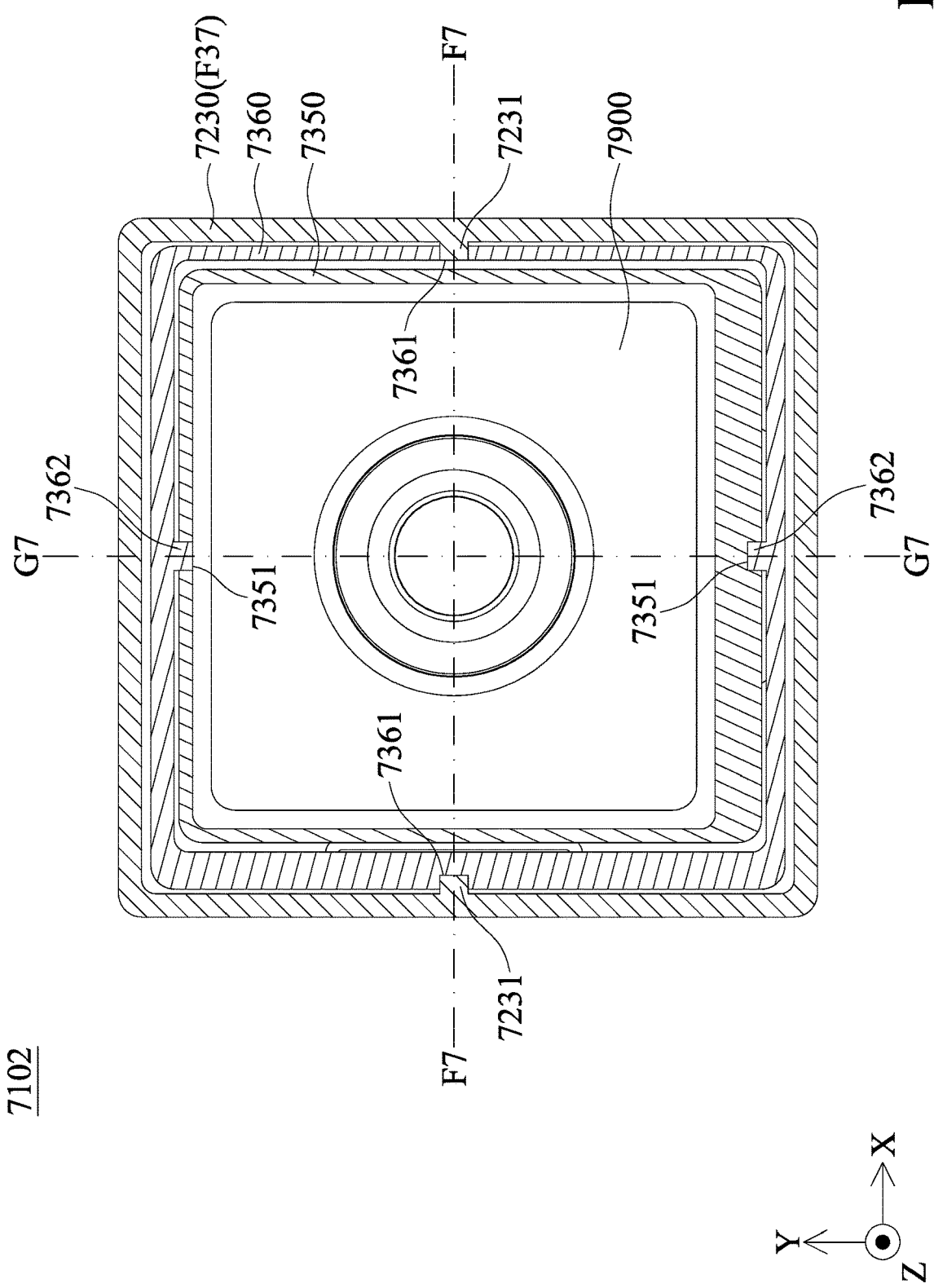
FIG. 24 is a top view of the optical element driving mechanism.

FIG. 24 is a top view of the optical element driving mechanism 7102. The base 7230 may include two contact portions 7231 extending to the movable portion M37, the second movable portion 7360 may include two contact portions 7362 extending to the first movable portion 7350, and the first movable portion 7350 may has recesses 7351 corresponding to the contact portions 7362. It should be noted that the line F7-F7 of the two contact portions 7231 and the line G7-G7 of the two contact portions 7362 may be substantially perpendicular to each other to allow the first movable portion 7350 and the second movable portion 7360 to move in different directions.

Figure 25:
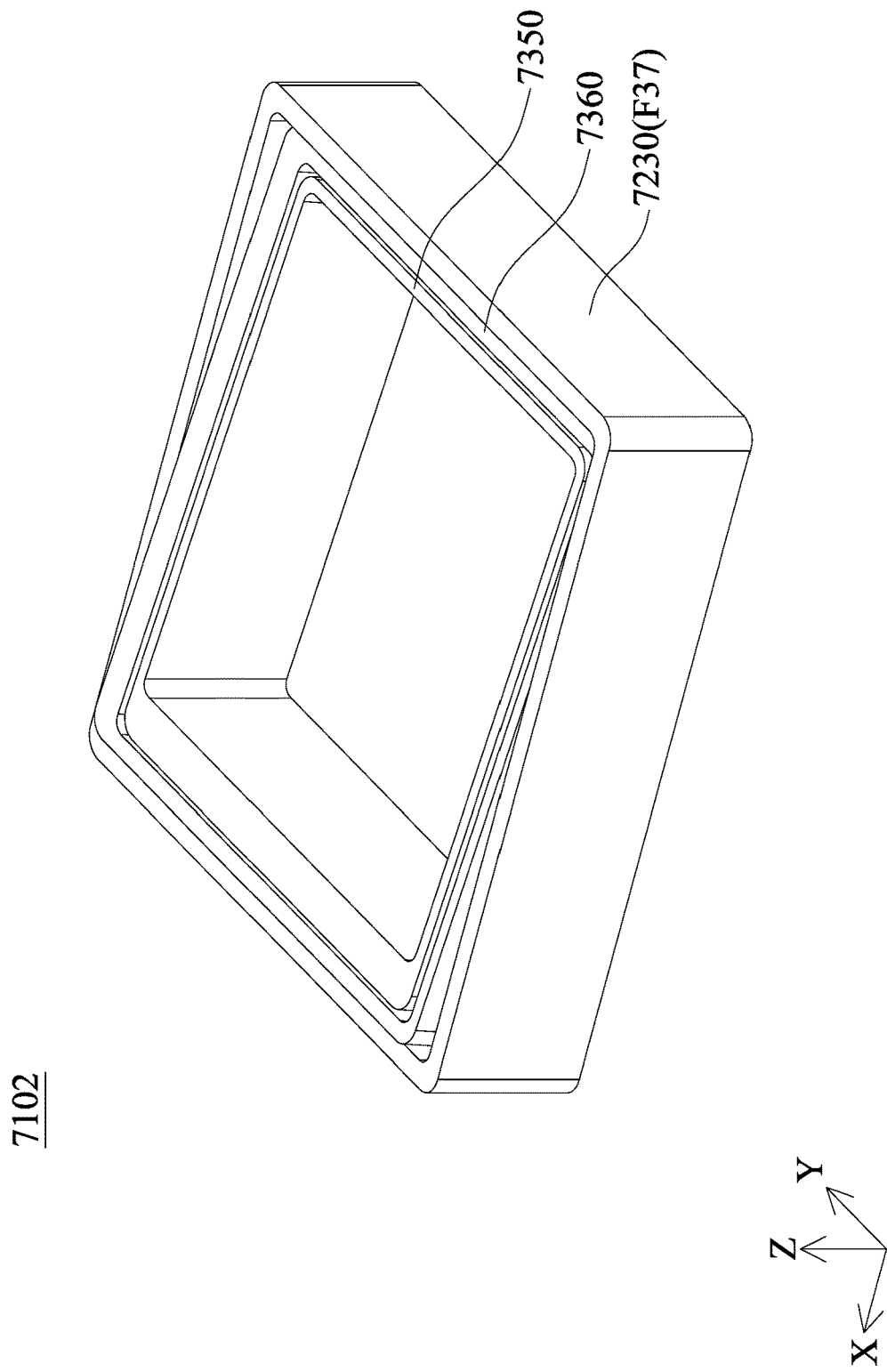
FIG. 25 is a perspective view when the second movable portion rotates relative to the base.
Figure 26:
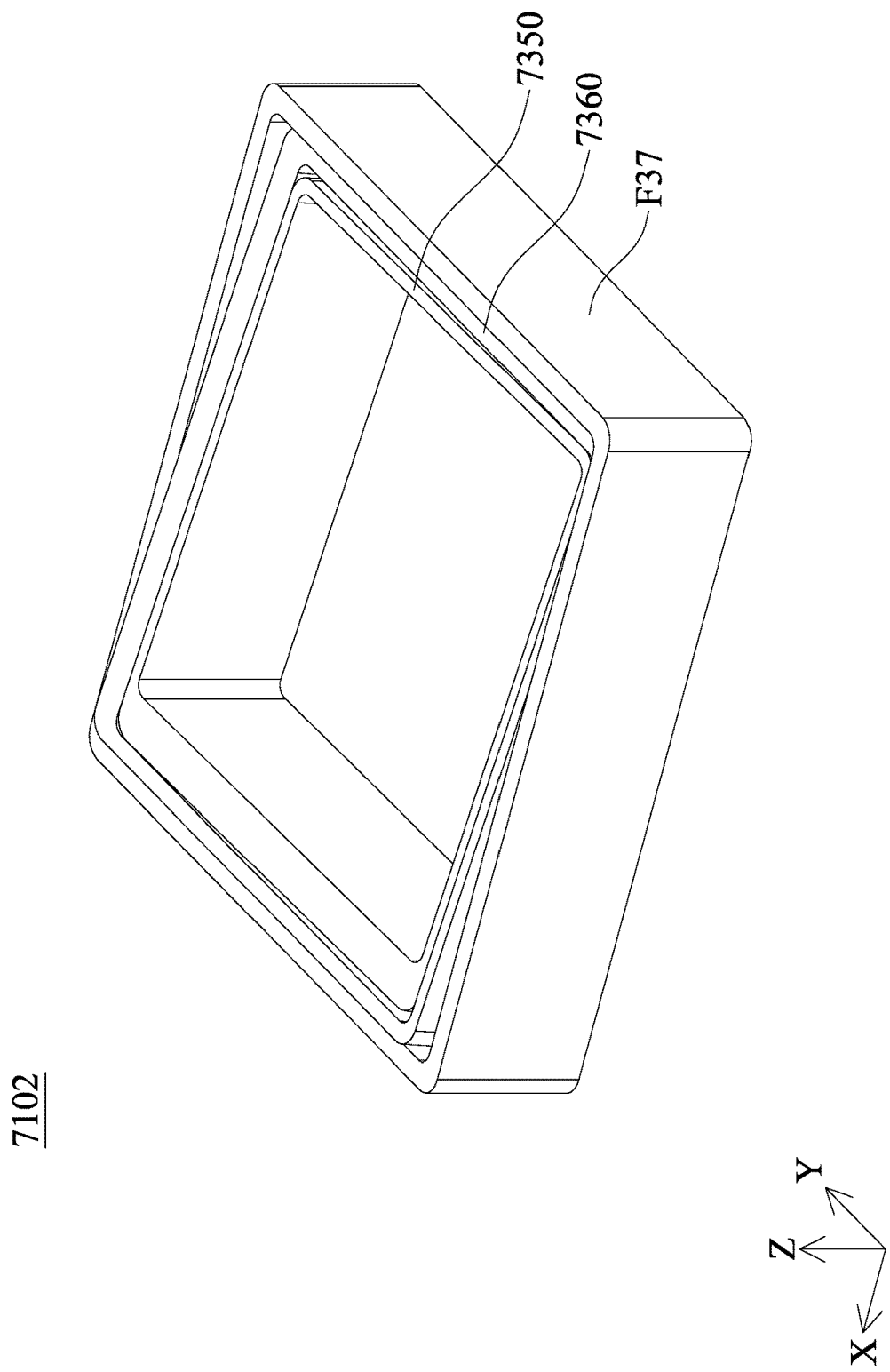
FIG. 26 is a perspective view when the first movable portion further rotates relative to the second movable portion after the condition in FIG. 25.

FIG. 25 is a perspective view when the second movable portion 7360 rotates relative to the base 7230, wherein the first movable portion 7350 does not move relative to the second movable portion 7360. FIG. 26 is a perspective view when the first movable portion 7350 further rotates relative to the second movable portion 7360 after the condition in FIG. 25. As shown in FIG. 25 and FIG. 26, the movable portion M37 may rotate in different directions by the driving force generated from the driving assembly to achieve optical image stabilization.

In summary, an optical element driving mechanism is provided, including a fixed portion, a movable portion, and a driving assembly. The movable portion is movably connected to fixed portion, wherein the movable portion is used for connecting to an optical element having a main axis. The driving assembly is disposed on the fixed portion or the movable portion to move the movable portion relative to the fixed portion. The design of the present disclosure provides the optical element with additional directions of motion, so the performance of the optical module is improved, and miniaturization can be achieved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed portion;
a movable portion movably connected to fixed portion, wherein the movable portion is used for connecting to an optical element having a main axis, and the movable portion comprises
a first movable portion, comprising a first contact portion having two sides, wherein a first angle is formed by the two sides;
a second movable portion having a first recess, wherein the first contact portion is disposed in the first recess, a shape of a portion of the first contact portion in contact with the first recess is a round angle; and
a driving assembly disposed on the fixed portion or the movable portion to move the movable portion relative to the fixed portion, wherein a second angle is formed between the sidewalls of the first recess and the first angle is less than the second angle.

2. The optical element driving mechanism as claimed in claim 1, further comprising a resilient element, wherein the second movable portion is movably connected to the fixed portion, and the first movable portion and the fixed portion are connected by the resilient element.

3. The optical element driving mechanism as claimed in claim 2, wherein the driving assembly comprises two first magnetic elements respectively disposed on the first movable portion and the second movable portion.

4. The optical element driving mechanism as claimed in claim 2, wherein the fixed portion comprises a case, and the case and the first movable portion do not overlap each other when viewed along the main axis.

5. The optical element driving mechanism as claimed in claim 2, wherein the second movable portion comprises a second contact portion in direct contact with the fixed portion.

6. The optical element driving mechanism as claimed in claim 5, wherein the fixed portion comprises a base having a rectangular shape, the base comprises an extending portion at a corner of the base, and the second contact portion is in direct contact with the extending portion of the base.

7. The optical element driving mechanism as claimed in claim 5, wherein the fixed portion comprises a base having a rectangular shape, the base comprises an extending portion at a side of the base, and the second contact portion is in direct contact with the extending portion of the base.

8. The optical element driving mechanism as claimed in claim 5, wherein the second contact portion and the fixed portion comprise an identical material.

9. The optical element driving mechanism as claimed in claim 8, wherein the material comprises metal.

10. The optical element driving mechanism as claimed in claim 5, wherein the fixed portion has a second recess, and a portion of the second contact portion that contacts the second recess has a shape of a round angle.

11. The optical element driving mechanism as claimed in claim 10, wherein the second recess has a flat surface in direct contact with the second contact portion.

12. The optical element driving mechanism as claimed in claim 10, wherein the contact portion has a distance greater than zero from a sidewall of the second recess.

13. The optical element driving mechanism as claimed in claim 1, wherein the driving assembly comprises a first magnetic element and a second magnetic element respectively disposed on the movable portion and the fixed portion.

14. The optical element driving mechanism as claimed in claim 1, wherein the movable portion comprises a first movable portion and a second movable portion, the fixed portion comprises a base, the base has a bottom surface facing away from the movable portion, and a minimum distance between the first movable portion and the bottom surface of the base is different than a minimum distance between the second movable portion and the bottom surface of the base.

15. The optical element driving mechanism as claimed in claim 1, wherein the fixed portion comprises a case having a rectangular shape, and an opening is formed at a corner of the case.

16. The optical element driving mechanism as claimed in claim 1, wherein the fixed portion comprises a case and a base, and a recess is formed between the case and the base when viewed in a direction that is perpendicular to the main axis.

17. The optical element driving mechanism as claimed in claim 1, wherein the material of the fixed portion and the movable portion comprises non-magnetic permeable material.

18. The optical element driving mechanism as claimed in claim 1, wherein the first recess has a flat surface in direct contact with the first contact portion.

19. The optical element driving mechanism as claimed in claim 1, wherein a distance is formed between the first contact portion and one of the sidewalls of the first recess.

* * * * *